(12) United States Patent
Nakamura et al.

(10) Patent No.: US 7,525,430 B2
(45) Date of Patent: Apr. 28, 2009

(54) MACHINE COMPONENTS HAVING IC TAGS, QUALITY CONTROL METHOD AND ABNORMALITY DETECTING SYSTEM

(75) Inventors: Shohei Nakamura, Mie (JP); Shouichi Hioki, Mie (JP); Hiroyoshi Ito, Mie (JP); Tooru Mayumi, Mie (JP); Mitsuo Sasabe, Osaka (JP)

(73) Assignee: NTN Corporation, Osaka (JP)

( * ) Notice: Subject to any disclaimer, the term of this patent is extended or adjusted under 35 U.S.C. 154(b) by 135 days.

(21) Appl. No.: 10/545,630

(22) PCT Filed: Feb. 16, 2004

(86) PCT No.: PCT/JP2004/001667

§ 371 (c)(1),
(2), (4) Date: Aug. 12, 2005

(87) PCT Pub. No.: WO2004/072747

PCT Pub. Date: Aug. 26, 2004

(65) Prior Publication Data

US 2006/0170551 A1    Aug. 3, 2006

(30) Foreign Application Priority Data

Feb. 14, 2003 (JP) ............................ 2003-036912
May  1, 2003 (JP) ............................ 2003-126362
Jul.  4, 2003 (JP) ............................ 2003-191672

(51) Int. Cl.
G08B 13/14  (2006.01)
(52) U.S. Cl. ................ 340/572.1; 340/539.24; 340/682; 384/448

(58) Field of Classification Search ........... 340/572.1, 340/572.5, 572.8, 539.1, 539.24, 682; 384/448, 384/544
See application file for complete search history.

(56) References Cited

U.S. PATENT DOCUMENTS

| 4,237,454 A * | 12/1980 | Meyer ................. 340/682 |
| 6,501,382 B1 * | 12/2002 | Rehfus et al. ......... 340/572.8 |
| 6,720,866 B1 * | 4/2004 | Sorrells et al. ........ 340/10.4 |
| 6,971,799 B2 * | 12/2005 | Sato et al. ............ 384/448 |
| 7,009,515 B2 * | 3/2006 | Carrender ............. 340/572.1 |
| 2002/0186134 A1 | 12/2002 | Rehfus et al. |

FOREIGN PATENT DOCUMENTS

| JP | 2001-056847 | 2/2001 |
| JP | 2002-169858 | 6/2002 |
| WO | WO 00/45324 | 8/2000 |

OTHER PUBLICATIONS

Patent Abstracts of Japan, Publication No. 2001-056847 dated Feb. 27, 2001, 2 pages.
Patent Abstracts of Japan, Publication No. 2002-169858 dated Jun. 14, 2002, 2 pages.
Chinese Office Action dated Oct. 26, 2007 and issued in CN Application No. 2004800040357 (5 pages).

* cited by examiner

*Primary Examiner*—Davetta W Goins
(74) *Attorney, Agent, or Firm*—Osha • Liang LLP

(57) ABSTRACT

There is provided a machine component having an IC tag attached thereto, which can be controlled consistently from manufacture to disposal without the IC tag missed on the way. The machine component is embedded with the IC tag (110) made up of an IC chip having recorded thereon information unique to the relevant machine component and an antenna connected electrically with the IC chip.

39 Claims, 25 Drawing Sheets

MACHINE COMPONENTS HAVING IC TAGS, QUALITY CONTROL METHOD AND ABNORMALITY DETECTING SYSTEM

FIELD OF THE INVENTION

The present invention relates to the consistent control of machine components such as rolling bearings, joints, hub bearings and clutches, which are embedded with IC tags utilizing the radio frequency identification (RFID) technology, from manufacture thereof to disposal.

BACKGROUND ART

The RFID technology is a generic term descriptive of a data identification method using radio frequencies or identifying media utilizing such data identification method and makes use of an RFID system including an IC tag serving as a data carrier, an IC tag reader/writer and an administrative personal computer. As shown in FIG. 4, the IC tag includes an IC chip, carrying data on merchandise or product information, and a miniature antenna, all embedded in a plastic card. The IC chip contains an ID memory and a communication control circuit. When the IC tag is attached to an object to be identified and information carried thereby is picked up by means of a reader/writer by radio, a traffic control, a merchandise or product control or identification can be accomplished.

By way of example, the Japanese Laid-open Patent Publication No. 2001-56847 discloses an ID tag (IC tag), in which the antenna works satisfactorily even when held in contact with a metallic plate, which can be formed to a relatively small thickness and which does not spoil portability.

However, any machine component carrying an IC tag has not yet been made available in the art, which can be consistently controlled from production to disposal with no possibility of the IC tag being lost.

Under these circumstances, demands have recently increased to enable the traceability of the products, which makes it possible to trace the history, application and whereabouts of products to be identified. When it comes to the quality control of machine components, it is desired that the production history on quality, lot and others at every stage of the manufacturing process from purchase of materials to completion of manufacture (including purchase of materials, forging stage, heat treatment stage, grinding stage and others) can be ascertained or identified on each of the machine components or on a lot-by-lot basis. By way of example, specialty goods such as aircraft bearings are generally examined one by one and, accordingly, it is generally required for the production history of each of those specialty goods to be ascertained. In the case of general goods such as bearings for use with automobiles and industrial machines, the lot-based control is generally practiced and the lot-by-lot sampling inspection procedure is carried out for each lot of products and, accordingly, it is required for the lot-by-lot production history to be ascertained. If the production history is available, not only can the manufacturer easily work around with replacement, identification of a batch or lot of products containing one or more products to be rejected and/or future improvements in the event of occurrence of one or more defective products, but life estimation and a prior replacement in anticipation of a possible occurrence of machine troubles can also be performed easily. In addition, determination of mix-up of analogous goods can also be performed easily.

As a quality control method for clarifying the production history, the method has hitherto been practiced, in which information arising from each stage of the manufacturing process is recorded on a check note or sheet and/or inputted to a database terminal.

On the other hand, in the field of physical distribution management and stock management, the IC tag is increasingly used and, even in the manufacture of components for automobiles, the control from production to disposal using the IC tag has been suggested. See, for example, the Japanese Laid-open Patent Publication No. 2002-169858. Since the IC tag has the ability to record and read out information on a non-contact basis and, since it can have a large storage capacity, a sophisticated control can be expected.

According to the conventionally suggested quality control method using the IC tags, by directly recording various pieces of information about a machine component on the IC tag attached to such machine component, or by consulting the database for the machine component having such identification information while recording identification information about the machine component on the IC tag, material, lot control information and data on various histories, all associated with the machine component can be identified. However, the cause of trouble in the machine component may not be ascertained only with the information on the machine component. By way of example, difference in processing condition at every stage of the manufacturing process often brings about difference in quality and such difference brought about by the difference in the processing condition cannot be often recognized from results of examination. Considering that machine components such as rolling bearings, shaft couplings and ball screws are generally made up of a plurality of elements, even though the results of examination of the machine components are made available, it is virtually difficult to identify the presence or absence of any defect and/or trouble arising from the difference in quality of those elements. In particular, in the case of the machine component including rolling elements of, for example, the rolling bearing, even slight difference in material and precision affects the performance of the resultant machine component and, therefore, the conventionally suggested quality control method using the IC tags is incapable of resolving those problems.

Also, as for the production control, the conventional control method in which data are recorded on a check note or sheet and/or inputted to a terminal device at every stage of the production process requires complicated and time-consuming procedures in accomplishing the recording and/or inputting and, therefore, it is quite difficult for a substantial amount of information to be recorded carefully and meticulously. Specifically, in the case that machine components such as rolling bearings are made up of a plurality of elements and those elements are manufactured on a lot basis throughout the manufacturing process including purchase of material, forging stage, heat treatment stage and grinding stage, the control of those elements at every stage of the manufacturing process is complicated and it is time-consuming to record and input the history information on each of the elements by hand. For this reason, it is difficult to provide the detailed information on history of the machine components, and the control of such information is costly.

In view of the foregoing, the use of the IC tag has been contemplated, but it has been found that the quality control system employed in association with articles of manufactures such as automobiles cannot be applied to the machine components of the kind discussed above. According to the previously mentioned Patent Document (Japanese Laid-open Patent Publication No. 2002-169858), the IC tag is attached to automobiles, which are an object to be controlled, so that information on every stage of the manufacturing process can be recorded. This IC tag is affixed to a frame of each automobile. However, considering that the machine components such as rolling bearings do not make use of any complete element usable as a standard object similar to the automobile frame and that during the manufacturing process those elements are manufactured through forging, heat treatment and the others, no IC tag can be affixed to each machine component itself from the beginning of the manufacturing process. Also, since in the case of the machine components such as rolling bearings, inner races, outer races, rolling elements and other elements are controlled individually at each stage of the manufacturing process including, the purchase of material, a forging stage, a heat treatment stage and a grinding stage, it is difficult to determine how to use the IC tags for the quality control. More specifically, it is difficult to determine which stage of the manufacturing process the IC tag is applied to and/or what portion of each machine component the IC tag should be attached to. Thus, the efficient use of the IC tags is difficult.

Also, there are numerous machines and equipments employing a number of rolling elements as machine components. It is often experienced that the rolling bearings are hardly controlled for lifetime despite of the needs for such control. For example, in the case of the thermal power plant, coals used as fuel are transported with a coal carrier vessel and are then disembarked by a coal lifting crane onto a belt conveyor. The coals transported by the belt conveyor are subsequently piled up on a coal yard and are, when to be consumed, again transported by a belt conveyor towards a boiler. This boiler must be continuously operated along with the belt conveyor to maintain the electric power supply and high fuel efficiency. The belt conveyors make use of hundreds of bearing units of a structure in which bearings are incorporated in tubular rollers.

The belt conveyor must be halted once any abnormality occurs as a result of damages in a major bearing portion used in, for example, a drive unit and, therefore, the major bearing portion must be monitored at all times. To meet this requirement, it is a general practice to use temperature sensors and vibration sensors in those bearings so that they can be monitored at all times as to changes in temperature and vibration. In contrast thereto, since each roller positioned generally intermediate of the length of the belt conveyor and supporting the endless belt makes use of hundreds of bearings, all of those bearings cannot be controlled individually in a manner similar to the major bearing portions of the drive unit and it is not realistic to monitor all of those bearings at all times in the terms of the cost. For this reason, based on a record of the previous replacement date of the bearings, replacement of the bearings is carried out ahead of time to ensure safety before the rated lifetime reaches. In such case, the replacement of the bearings is carried out with the roller incorporating the bearings on a roller-to-roller basis without the belt conveyor being halted.

When it comes to a railway vehicle in which a considerable number of bearings are employed for rotatably supporting wheels, once the railway vehicles start moving, they cannot be brought to a stop along the way in order to transport passengers and/or cargos to the destination. As such, to prevent any trouble from occurring during the operation of the railway vehicles, the bearings are regularly inspected and controlled while the railway vehicle is not operated.

Even with the intermediate rollers used to support the endless belt in the conventional thermal power plant, it is highly possible that the conveyor must be halted depending on the condition of damages once an abnormality occurs in the bearings. The routine bearing replacement can be carried out with proper measures without halting the conveyor solely for replacement purpose. However, the replacement of the bearings while the conveyor is being driven will not be accomplished in the event of an unforeseeable abnormality in the bearings. Even where the early replacement is performed before the rated lifetime, an unforeseeable abnormality in the bearings may occur and no one can know in advancement when it occurs.

On the other hand, in the case of the wheel support bearings used in the railway vehicles, the routine examination of those wheel support bearings is generally carried out while the railway vehicles are not operated as discussed previously. However, in the case of railway vehicles that are operated for a substantial period of time and over a long distance at high speeds, conditions of use of the wheel support bearings are indeed severe. As such, the routine examination is not sufficient to prevent any abnormality in the bearings. As a matter of course, the condition of the wheel support bearings while the railway vehicles are operated cannot be grasped when the railway vehicles are not operated.

DISCLOSURE OF THE INVENTION

In view of the foregoing problems and inconveniences discussed hereinbefore, one object of the present invention is to provide a machine component having an IC tag attached thereto, which can be consistently controlled from manufacture to disposal thereof with no possibility of the IC tag being lost.

Another object of the present invention is to provide a quality control method for controlling machine components having a plurality of elements such as rolling elements, which method is effective to facilitate traceability and to enable identification of manufacturing information at each stage of the manufacturing process including forging, heat treatment and grinding to be accomplished even after shipment of those machine components or delivery thereof to the customer.

A further object of the present invention is to provide a quality control method for controlling machine components that are to be examined individually and that are formed by assembling a plurality of elements separately manufactured through a forging process, a heat treatment process and other processes, which method is effective to control the detailed histories of information on purchase of material for those elements to results of examination done after completion of the machine components, on a one-to-one basis with each of the machine components.

A still further object of the present invention is to provide a quality control method for controlling machine components that are to be examined on a lot-to-lot basis and that are formed by assembling a plurality of elements separately manufactured through a forging process, a heat treatment process and other processes, which method is effective to control, for each manufacturing lot of the machine components, the detailed histories of information on purchase of material for those elements to results of examination done after completion of the machine components.

A still further object of the present invention is to provide a simple and inexpensive abnormality detecting system effective to perform an examination to easily identify the presence or absence of an abnormality occurring in a number of bearings while each of those bearings is operated so that an occurrence of the abnormality in some of the bearings can be prevented.

In order to accomplish these objects of the present invention, the first aspect of the present invention provides a machine component including an IC tag embedded therein. This IC tag includes an IC chip having information unique to such machine component recorded therein, and an antenna electrically connected with the IC chip. Embedding of the IC tag in the machine component renders the IC tag to be a component part of the machine component, which lasts as embedded in the machine component until the latter is disposed. Accordingly, it is possible to accomplish a consistent control based on unique information recorded on, rewritten or updated and added to the IC tag during a period ranging from storage and sales of the machine component to manufacture of a product utilizing the machine component and to disposal of the product.

In a preferred embodiment of the present invention, the machine component according to the first aspect of the present invention is made of a metallic material and is formed with a pocket and wherein the IC tag is fixed within the pocket by means of a synthetic resin after having been inserted into the pocket.

Also, in a preferred embodiment of the present invention, the machine component according to the first aspect of the present invention is a bearing.

The second aspect of the present invention provides a quality control method for controlling a machine component, in which an IC tag is attached to the machine component to enable the traceability of the quality control based on only information recorded on the IC tag. More specifically, this quality control method is for controlling the quality of the machine component having a plurality of elements including a rolling element by utilizing a non-contact recordable/readable IC tag having recorded therein manufacturing information on each stage of a manufacturing process ranging from purchase of material for the machine component to an examination stage by way of forging, heat treatment and grinding stages. This quality control method includes a step of attaching the IC tag to any one of the plural elements of the machine component at a time of manufacture of the machine component or at a time of completion of the manufacture thereof; a step of recording on the IC tag attached to the machine component, at least one of material information and processing condition information related to at least one of the forging, heat treatment and grinding stages, by the time of shipment or by the time of delivery to a customer; and a step of reading the information recorded on the IC tag at any desired time subsequent to the shipment and making a confirmation of at least one of the processing condition information and the material information with reference to the information read out from the IC tag.

According to the foregoing quality control method, at the level of reading of the information at any desired time subsequent to the shipment, it is possible to verify material information or processing condition information on at least one of the forging, heat treatment and grinding stages. Since it is possible to verify the various pieces of information to an extent up to the processing condition information and others, in the event that any trouble occurs in the machine component having a plurality of elements including rolling elements and which requires severe quality and precision, the trouble shooting or the like can easily be accomplished. In the practice of this method, no extra database is needed and the information can be controlled only by the utilization of the IC tag and, therefore, in a facility where the processing condition information or the like is confirmed, the processing condition information or the like can be read out regardless of the presence or absence of any communication equipment necessary to make access to the database and the presence or absence of the access authority.

The third aspect of the present invention also provides a quality control method for controlling a machine component, in which an IC tag attached to the machine component and a database are utilized to enable the traceability of the quality control. More specifically, this quality control method is for controlling a machine component having a plurality of elements including a rolling element by utilizing a non-contact recordable/readable IC tag and a database for storing predetermined manufacturing information on each stage of a manufacturing process ranging from purchase of material for the machine component to an examination stage by way of forging, heat treatment and grinding stages together with identifying information associated with the machine component and for allowing storage contents in the database to be extractable with reference to the identifying information, to enable the traceability for quality control purpose. The quality control method includes a step of attaching the IC tag to any one of the plural elements of the machine component at the time of manufacture of the machine component or at the time of completion of the manufacture thereof; a step of recording on the IC tag attached to the machine component in accordance with the database, the identifying information related to the machine component and at least one of material information and processing condition information related to at least one of the forging, heat treatment and grinding stages by the time of shipment or by the time of delivery to a customer; and a step of reading, at any time subsequent to the shipment, the information recorded on the IC tag and making a confirmation of at least one of the processing condition information and the material information or a confirmation of results of examination with reference to the information read out from the IC tag or with reference to information obtained by checking the information read out from the IC tag with the database.

Even with the foregoing quality control method, at the level of reading of the information at any desired time subsequent to the shipment, it is possible to verify material information or processing condition information on at least one of the forging, heat treatment and grinding stages. For this reason, in the event that any trouble occurs in the machine component which has a plurality of elements including a rolling element and which requires severe quality and precision, the trouble shooting or the like can easily be accomplished. Also, since the IC tag attached to the machine component is recorded with the identifying information and the database is recorded with various pieces of information in correspondence with the identifying information, a number of pieces of information can be extracted from the database with no need to rely on the limited available storage capacity of the IC tag. Yet, available memory in the IC tag can be effectively utilized for the control of various histories subsequent to the shipment and even after the delivery to a customer.

The fourth aspect of the present invention furthermore provides a quality control method, in which an IC tag attached to a machine component and a database are utilized to enable the traceability of the quality control and also to enable any one of the date of manufacture, the place of manufacture, the brand of a filled grease, the element-to-element gap size, the term of warranty and the handling caution to be ascertained. This quality control method is particularly for controlling a machine component having a plurality of elements including a rolling element by utilizing a non-contact recordable/readable IC tag and a database for storing predetermined manufacturing information on each stage of a manufacturing process ranging from purchase of material for the machine component to an examination stage by way of forging, heat treatment and grinding stages together with identifying information associated with the machine component and for allowing storage contents in the database to be extractable with reference to the identifying information, which method includes a step of attaching the IC tag to any one of the plural elements of the machine component at the time of manufacture of the machine component or at the time of completion of the manufacture thereof; a step of recording on the IC tag attached to the machine component in accordance with the database, the identifying information related to the machine component and information on at least one of the date of manufacture, the place of manufacture, the brand of a filled grease, the element-to-element gap size, the term of warranty, the handling caution, the date of shipment and the output precision (in the case of a sensor built-in bearing or the like); a step for reading, at any time subsequent to the shipment, the information recorded on the IC tag and making a confirmation of the material purchased, a confirmation of the manufacturing process, a confirmation of one of the processing condition and the material information or a confirmation of results of examination with reference to the information read out from the IC tag or with reference to information obtained by checking the information read out from the IC tag with the database.

In the case of the quality control method according to the fourth aspect of the present invention, during the step of reading out the information subsequent to the shipment, it is possible to confirm any one of the material purchase, the manufacturing process, the processing condition and the results of examination, based on the information recorded on and subsequently read from the IC tag, or based on the information obtained by checking the read-out information used as a key with the database. Also, any one of the date of manufacture, the place of manufacture, the brand of a filled grease, the element-to-element gap size, the term of warranty, the handling caution, all recorded on the IC tag can also be verified from the IC tag. The pieces of information such as the date of manufacture, the place of manufacture, the brand of a filled grease, the element-to-element gap size, the term of warranty, the handling caution are those desired to be readily available in every situation and, therefore, it may be considered convenient in terms of facilities and labors that any of those pieces of information can be available from the IC tag with making no access to the database. Since the grease is available in various kinds, for example, for high temperature use, for low temperature use and for any other application and can hardly be identified at the glance of appearance thereof, it would be very convenient if those pieces of information can be read from the IC tag. Also, considering that the grease degrades with passage of time, if the brand of the grease is identifiable together with the date of manufacture thereof, it is possible at the time of delivery to a customer to ascertain if the grease can be used as it is and/or if replacement of the grease is required, avoiding the possibility that a product filled with an old grease may be delivery to the customer. The element-to-element gap size is intended to speak of, for example, the radial gap size in a rolling bearing.

The quality control method according to any one of the second to fourth aspect of the present invention may also include the following steps. Specifically, the quality control method may include a step of recording the manufacturing information on a manufacturing process of each of the elements of the machine component including the purchase of material, forging stage, heat treatment stage and grinding stage, on an IC tag prepared for each lot number of the elements at each of the manufacturing stages; and a step of reading the information recorded from the IC tag attached to the element and recording portion or the whole of the information, which has been read from the IC tag, on the IC tag attached to the machine component. In this case, the manufacturing information recorded on the IC tag for the manufacturing process includes processing condition information descriptive of processing conditions during at least one of the forging, heat treatment and grinding stages and/or material information descriptive of material used to form the elements.

As described above, during the manufacture of the elements, the manufacturing information on each stage of a manufacturing process of the element ranging from purchase of material, forging stage, heat treatment stage and grinding stage is recorded at each stage on the IC tag prepared for each lot number of the elements, the detailed information can be recorded as compared with recording on a check sheet by handwriting and, since unlike inputting from, for example, the terminal into the database, it is the IC tag where the information must be inputted, visual recognition is possible, an inputting work is clear and an error will hardly occur. Also, since unlike recording in a database the various and numerous pieces of information on the manufacturing process of the element at every stage thereof ranging from the purchase of material to the grinding, those pieces of the recorded information are carried by the IC tag, the database is less loaded and can easily be controlled. For this reason, the further detailed information can be easily controlled. When the number of lots increases at the downstream manufacturing stage, new additional IC tags are prepared for those increased lots.

Recording of the manufacturing information during the manufacture of the elements may be made in the database. In other words, the quality control method according to any one of the second to fourth aspects of the present invention may also include a step of recording on a time-of-manufacture control database the manufacturing information on a manufacturing process of the elements of the machine component including the purchase of material, forging stage, heat treatment stage, grinding stage and examination stage, in association with an identifying number assigned to each lot number of the elements or each of the elements; and a step of recording the manufacturing information, which has been recorded in the time-of-manufacture control database, on the IC tag attached to the machine component.

As a quality control method in which the manufacturing control IC tag prepared for each lot number is used for the control of the manufacturing information during the manufacture of the elements, any of the following methods according to fifth and sixth aspects of the present invention can be employed.

The quality control method according to the fifth aspect of the present invention is for controlling machine components to be examined individually each of which is formed by assembling a plurality of kinds of elements that are manufactured through a process of purchase of material, a forging stage, a heat treatment stage and a grinding stage, which method includes the following steps (1) to (4) with respect to each of the elements and the process described later is employed with respect to the machine component assembled with those elements.

(1) At the time of purchase of material for each of the elements, an IC tag prepared for each of material lots is recorded with a material lot number for the corresponding material lot and information concerning the material purchased.

(2) At the forging stage, the IC tag for the corresponding material lot or an IC tag having the same information recorded on the IC tag for the corresponding material lot is prepared. A forging lot number of a respective forging lot and information obtained during the forging stage are recorded on those IC tags.

(3) At the heat treatment stage, the IC tag for the corresponding forging lot or an IC tag having the same information recorded on the IC tag for the corresponding forging lot is prepared. A heat treatment lot number of a respective heat treatment lot and information obtained during the heat treatment stage are recorded on those IC tags.

(4) At the time of examination subsequent to the grinding stage, the IC tag for the corresponding heat treatment lot or an IC tag having the same information recorded on the IC tag for the corresponding heat treatment lotis prepared for each of the elements or for each of sets of the elements of the same kind, each of which sets providing a basis for a unit for examination. A respective grinding lot number and information obtained at the time of examination are recorded on those IC tags.

The IC tag is attached to each of the machine components, assembled with the elements, during the assemblage. Of a manufacturing number unique to each of the machine components and the information recorded on the IC tag subsequent to the stage of examination of each of the elements, at least the manufacturing number is recorded on the IC tag attached to the respective machine component. On the database, the information recorded on the IC tag subsequent to the stage of examination of each of the elements and information on examination of the respective machine component subsequent to completion are recorded in association with the manufacturing number.

It is to be noted that the flow from the material purchasing to the grinding stage is a general manufacturing flow of how each of the elements is manufactured and each of the stages is broadly classified. Accordingly, each of those stages may include a plurality of sub-stages or may include other stages not listed above. By way of example, where grinding and heat treatment stages are carried out successively after the forging, the grinding stage may be included in the forging stage. Also, at the step of recording the information obtained during each of the forging stage (2), the heat treatment stage (3) and the grinding stage (4), process condition information on each of those steps (2) to (4) may be included.

According to the quality control method of the fifth aspect, since the information on the history ranging from the purchase of the materials for the respective elements to the examination made subsequent to completion of the machine component are stored in the database and the manufacturing number is recorded on the IC tag attached to the machine component, checking the manufacturing number with the database makes it possible for the history information to be controlled for each of the machine components. Since the information generated during each manufacturing stage of the elements is recorded on the IC tag, provided for each lot in each manufacturing stage, together with the lot number, the detailed history information can be controlled.

Accordingly, in the event that the defective product is found, replacement of the defective product, identification of a batch containing the defective product, and future's countermeasures for improvement can easily be accomplished and lifetime diagnosis and an advance replacement in anticipation of a trouble in the machine can also be facilitated. Since the information on each of the manufacturing stages is recorded on the IC tag prepared for each lot in the respective manufacturing stage, as compared with recording on a check sheet by handwriting, detailed information can be recorded. Also, since unlike inputting from, for example, the terminal into the computer, it is the IC tag where the information must be inputted, visual recognition is possible, an inputting work is clear and an error will hardly occur. Also, since unlike recording in a computer the various and numerous pieces of information on the manufacturing process at every stage thereof ranging from the purchase of material for the elements to the grinding, those piece of the recorded information is carried by the IC tag at each stage of the manufacturing process, the computer is rather less loaded and the control can be facilitated. For this reason, it is possible to achieve an easy control of the detailed information. Also, since the manufacturing number of the machine component is recorded on the IC tag attached to such machine component, the storage area remaining in this IC tag can be used freely and can be used for various applications after the manufacture, for example, shipment control, marketing control, customer control, maintenance control and so on.

A sixth aspect of the present invention provides a quality control method for controlling machine components that are examined for each lot by the lot-by-lot sampling inspection procedure. This quality control method is for controlling machine components which are formed by assembling a plurality of kinds of elements that are manufactured through a process of purchase of material, a forging stage, a heat treatment stage and a grinding stage, which method includes the following steps (1) to (3) and (4') with respect to each of the elements. The process described later is employed with respect to the machine component assembled with those elements. Although the steps (1) to (3) are identical to those of the quality control method according to the fifth aspect, they are reiterated.

(1) At the time of purchase of material for each of the elements, an IC tag prepared for each of material lots is recorded with a material lot number for the corresponding material lot and information concerning the material purchased.

(2) At the forging stage, the IC tag for the corresponding material lot or an IC tag having the same information recorded on the IC tag for the corresponding material lot is prepared. A forging lot number of a respective forging lot and information obtained during the forging stage are recorded on those IC tags.

(3) At the heat treatment stage, the IC tag for the corresponding forging lot or an IC tag having the same information recorded on the IC tag for the corresponding forging lot is prepared. A heat treatment lot number of a respective heat treatment lot and information obtained during the heat treatment stage are recorded on those IC tags.

(4') At the time of examination subsequent to the grinding stage, the IC tag for the corresponding heat treatment lot or an IC having the same information recorded on the IC tag for the corresponding heat treatment lot is prepared for each of grinding lots. A grinding lot number for the corresponding grinding lot and information obtained at the time of examination are recorded on those IC tags.

The IC tag is attached to each of the machine components, assembled with the elements, during the assemblage; of the manufacturing lot number unique to the machine component and the information recorded on the IC tag subsequent to the stage of examination of each of the elements, at least the manufacturing lot number is recorded on the IC tag attached to the respective machine component. The information recorded on the IC tag subsequent to the stage of examination of each of the elements and information on examination of the respective machine component subsequent to completion thereof are recorded in a database in association with the manufacturing lot number.

It is to be noted that at the step of recording the information obtained during each of the forging stage (2), the heat treatment stage (3) and the grinding stage (4'), process condition information for each of those stages (2) to (4') may be included.

This control method of the sixth aspect performs the control of the machine components for each manufacturing lot and will not provide a one-to-one control, unlike the control method of the fifth aspect. However, other effects and advantages similar to those of the control method of the first aspect can be obtained. Checking with the database is made using the lot number obtained from the IC tags attached to the respective machine components.

In the practice of the quality control methods of the present invention, the IC tag provided for each material lot, the IC tag provided for each forging lot and the IC tag provided for each heat treatment lot may be attached to a container accommodating a plurality of materials of the same material lot, a container accommodating a plurality of elements of the same forging lot and a container accommodating a plurality of elements of the same heat treatment lot, respectively.

Attachment of the IC tag may be carried out directly to the container or, alternatively, to a visual identifying tag attached to the container. Also, the IC tag may be removably attached to the respective container.

When the IC tag is so attached to the container, the IC tag provided for each lot can be moved at all times together with the elements of the same lot and can therefore easily be handled. In addition, recording of the information on the IC tag may be carried out along a path of transport of the elements.

Also in the practice of the quality control methods according to the present invention, the machine component may include elements different from the elements manufactured through a process of purchase of material, the forging stage, the heat treatment stage and the grinding stage, and information concerning those different elements may be recorded in the database after assemblage of the machine component in association with the manufacturing number or the lot number. This is particularly advantageous in that the information on the different elements can also be ascertained after completion of the machine component.

Yet in the practice of the present invention, provided that the machine component include the elements manufactured through a process of purchase of material, the forging stage, the heat treatment stage and the grinding stage, such machine component may be, for example, a rolling bearing, a constant velocity universal joint or any other shaft coupling and a ball screw.

In the case of the rolling bearing, the elements manufactured through a process of purchase of material, the forging stage, the heat treatment stage and the grinding stage may include an inner race, an outer race and rolling elements. The different elements that are not processed through those stages includes, for example, a retainer, sealing member and so on.

The machine component may be filled with a grease during assemblage thereof and, in such case, the IC tag attached to such machine component is preferably recorded with the date of assemblage of such machine component. The machine component filled with the grease includes, for example, a rolling bearing, a constant velocity universal joint or any other shaft coupling, a ball screw and son on.

As is well known to those skilled in the art, the grease tends to deteriorate with passage of time and, therefore, if the date of assemblage thereof is available, the control can easily be accomplished.

Moreover, in the practice of the quality control methods according to the present invention, the IC tag attached to the machine component may be recorded with information on whereabouts of the machine component from shipment of the machine component to delivery thereof to a customer. This is particularly advantageous in that the shipment control, the distribution control, the maintenance control and other can be facilitated.

Furthermore, the seventh aspect of the present invention provides an abnormality detecting system for detecting the presence or absence an abnormality in an IC tag and sensor equipped bearing assembly. In this case, the IC tag and sensor equipped bearing assembly constitutes a rolling bearing incorporated in a machine facility and includes an IC tag, a temperature sensor and an electric power source circuit, which circuit is incorporated in the IC tag or which is separate from the IC tag and is supplied with an electric power from an outside of the bearing on a non-contact basis for driving the temperature sensor. This abnormality detecting system includes a tag read/write terminal for reading or writing information from or on the IC tag and supplying the electric power to the electric power source circuit on the non-contact basis.

According to the seventh aspect of the present invention, a tag receiver is regularly or at any desired time moved to approach the IC tag and sensor equipped bearing assemblies and, at this time, an electric power is supplied to the electric power source circuit in each of the bearing assemblies so that the temperature sensor can be driven for an arbitrary length of time to allow it to perform a temperature measurement. The presence or absence of an abnormality in the bearing can be determined in reference to a result of measurement of the temperature. The temperature measured by the temperature sensor is transmitted wireless to the tag read/write terminal or transmitted only when a certain condition is met. Such a procedure may be performed to a number of IC tag and sensor equipped bearing assemblies with the single tag read/write terminal.

Because of the foregoing, only the provision of the IC tag and the electric power source circuit for supplying an electric power to the temperature sensor is sufficient and neither the transmitting device, the temperature sensor nor the electric power source necessary to drive the temperature sensor on a steady basis, which have hitherto been required in the case of the full-time examination, is employed and, accordingly, no corresponding receiver need be installed in each of the bearing unit. As such, the space for installation can advantageously be minimized and the equipment cost can also be minimized. By way of example, monitoring may be performed discontinuously once a day or once every two hours and many bearings can be monitored and, accordingly, it can accommodate satisfactorily even though the number of the bearings is too many. Also, since making reference to the result of the temperature measurement, the replacement can be done prior to actual occurrence of an abnormality, the machine facility itself will not meet a malfunctioning and will not be damaged. In addition, since the bearing likely to fail can be replaced during a regular servicing period in which the machine facility is halted, inventory control of the bearings and bearing units for replacement use can easily accomplished.

In the practice of the seventh aspect of the present invention, the IC tag and sensor equipped bearing assembly additionally may include a vibration sensor and wherein the electric power source circuit is capable of driving the vibration sensor.

Considering that the lifetime of the bearing can be determined in reference to vibrations, the availability of the sensor information other than the temperature information is effective to allow the presence or absence of an abnormality in the bearing to be determined more precisely.

Preferably, the IC tag may be recorded with identifying information required to identify the rolling bearing assembly having the IC tag attached thereto. The identifying information may include, for example, the manufacturing number and the lot number. If the identifying information on the bearing is available along with the information on the measurement of the temperature, the determination of the lifetime and the control with the use of a control for management can be facilitated. Also, the IC may have recorded thereon information concerning the place of installation of the bearing in the machine facility.

The machine facility may include a plurality of the IC tag and sensor equipped bearing assemblies arranged in a row. Where a plurality of bearings are arranged, the abnormality detecting system of the present invention, which utilizes the IC tag and sensor equipped bearing assemblies will work effectively.

In such case, a terminal moving means for moving a tag read/write terminal along the row of the IC tag and sensor equipped bearing assemblies may be employed, so that an electric power can be supplied to the tag read/write terminal to enable the latter to read or write information from or on the IC tag. The use of the terminal moving means allows a number of bearings to be easily monitored successively while the tag read/write terminal is regularly moved.

The machine facility referred to above may include a conveyor line including a belt conveyor or a roller conveyor. In such case, the IC tag and sensor equipped bearing assembly is applied to a roller for supporting a belt or a conveyor roller for the support of the belt.

Since in such a conveyor line a hundred of bearings are used, such an effect that the presence or absence of an abnormality can easily be examined while the abnormality detecting system of the present invention utilizing the IC tag and sensor equipped bearings is operated will become further effective.

In particular, where the machine facility is a belt conveyor used in, for example, a thermal power plant for transporting coals towards a boiler and wherein the IC tag and sensor equipped bearing assembly comprises a roller for supporting a belt or a conveyor roller, the number of the bearings is so extremely many that the conveyor cannot be halted, and accordingly the effects of the present invention can advantageously be exhibited effectively. By a similar reason, the effects of the present invention can effectively exhibited even where the present invention is applied to an elevator utilizing the IC tag and sensor equipped bearing assemblies.

Also, the machine facility may include a railway vehicle and the IC tag and sensor equipped bearing assembly includes a wheel support bearing. In this case, a tag receiver may be disposed along a path of travel of the railway vehicle to enable recording or reading information on or from the IC tag and also to enable the electric power source circuit to be supplied with an electric power.

While a number of the bearings are employed in the railway vehicle, the temperature of each of those bearing can be read out by the tag read/write terminal disposed along the path of travel of the railway vehicle and, therefore, the temperature of the bearings during the travel of the railway vehicle can be measured. For this reason, it is possible to help out the routine inspection generally done while the railway vehicle is halted, facilitating an accurate determination of the presence or absence of an abnormality in each of the bearings employed.

Furthermore, the eighth aspect of the present invention provides a method of detecting the presence or absence of an abnormality in an IC tag and sensor equipped bearing assembly. In this abnormality detecting method, a rolling bearing incorporated in a machine facility is constituted by an IC tag and sensor equipped bearing assembly which includes an IC tag, a temperature sensor and an electric power source circuit, which is incorporated in the IC tag or which is separate from the IC tag and is supplied with an electric power from an outside of the bearing on a non-contact basis for driving the temperature sensor. A tag read/write terminal for recording or reading information, recorded on the IC tag and also for supplying an electric power to the electric power source circuit on the non-contact basis is also employed to drive the temperature sensor regularly or at a desired timing to enable the information recorded on the IC tag to be read.

According to this abnormality detecting method, as is the case with that described in connection with the abnormality detecting system of the present invention, examination to determine the presence or absence of an abnormality in some of the plural bearings can easily be performed while the bearings are operated, facilitating a precautions prevention of the occurrence of an abnormality in some of the bearings. Also, this method is simple and inexpensive to perform.

The ninth aspect of the present invention provides an IC tag and sensor equipped bearing assembly, which includes an IC tag, a temperature sensor and an electric power source circuit incorporated in the IC tag or separate from the IC tag and adapted to be supplied with an electric power from an outside of the bearing for driving the temperature sensor.

According to the ninth aspect of the present invention, the IC tag and sensor equipped bearing assembly can advantageously be applied to the foregoing abnormality detecting system and the foregoing abnormality detecting method.

In this IC tag and sensor equipped bearing assembly, the IC tag, the temperature sensor and the electric power source circuit may be fixed in a raceway member of a rolling bearing. Where they are fixed in the raceway member, they can be firmly fixed.

Also, the IC tag, the temperature sensor and the electric power source circuit may be fixed to a sealing member or a retainer of the rolling bearing or may be embedded in a solid lubricant provided in the rolling bearing.

The raceway members require not only complicated manufacturing stages, but also severe requirements to be satisfied in terms of strength and, therefore, increase of the manufacturing stages may often be undesirable where the IC tag and the temperature sensor are to be incorporated. However, where the IC tag and the temperature sensor are fixed the sealing member or the retainer, which is a simple component part, attachment thereof can easily be accomplished. Also, even where they are embedded in the solid lubricant, fixture of the IC tag and others can easily be accomplished. In addition, where the IC tag and the temperature sensor are fixed in the seal member, the retainer or the solid lubricant, other component parts of the bearing assembly can be commonly shared with corresponding component parts of the standard bearing assembly having neither the IC tag nor others employed therein, and the same manufacturing process can be employed, thereby increasing the productivity.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Hereinafter, some preferred embodiments of the present invention will be described in detail with reference to the accompanying drawings.

Figure 1:
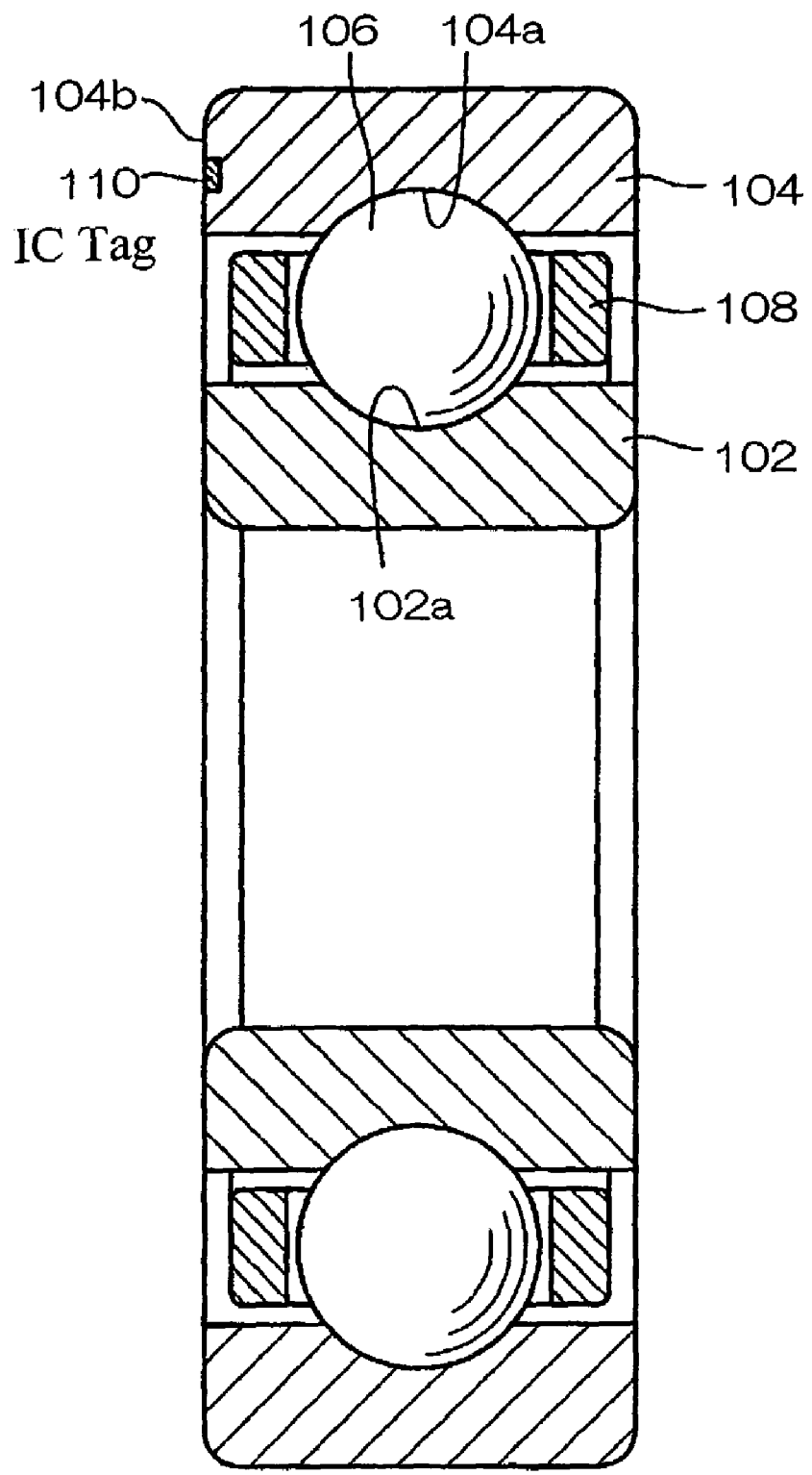
FIG. 1 is a longitudinal sectional view of a deep groove ball bearing assembly according to a first preferred embodiment of the present invention.

FIG. 1 illustrates, in a longitudinal sectional view, a first preferred embodiment of the present invention, that is, a deep groove ball bearing assembly as an example of machine components. This bearing assembly is made up of major constituent elements including an inner race 102, an outer race 104, a plurality of balls (rolling elements) 106 and a ball retainer 108. The inner race 102 has an outer peripheral surface formed with a raceway 102*a*. On the other hand, the outer race 104 has an inner peripheral surface formed with a raceway 104*a*. A row of the balls 106 are rollingly interposed between the raceway 102*a* in the inner race 102 and the raceway 104*a* in the outer race 104. The balls 106 are retained in a circular row by the ball retainer 108 and spaced equidistantly from each other in a direction circumferentially thereof. In the illustrated embodiment, an IC tag 110 is embedded in one of opposite end faces 104b of the outer race 104.

The IC tag 110 is preferably embedded in a portion of the bearing assembly where no load acts. Also, in order to monitor not only the bearing assembly itself but also the condition under which the bearing assembly is operated, the IC tag 110 needs to have an antenna capable of receiving radio wave from outside.

Where the IC tag is embedded in a machine component made of metal, if an antenna coil is held in contact with the metal, eddy currents will be produced on a metallic plate by radio waves emitted towards the antenna coil and the tag will possibly no longer work under the influence of those eddy currents. Accordingly, an IC chip and an antenna coil, both forming respective parts of the IC tag, have to be covered with a synthetic resin before the IC tag is embedded in a metallic product.

Figure 2A:
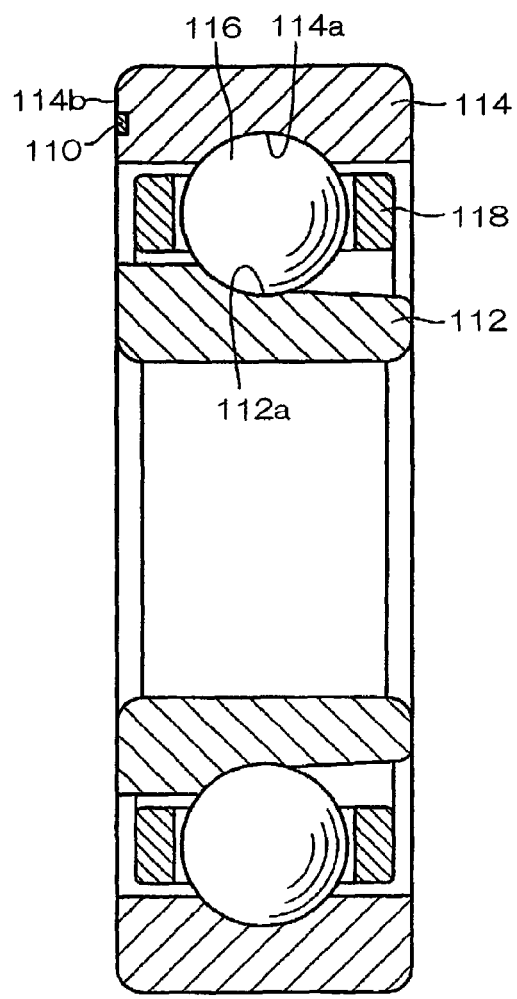
FIG. 2A is a longitudinal sectional view of an angular ball bearing assembly according to a second preferred embodiment of the present invention.
Figure 2B:
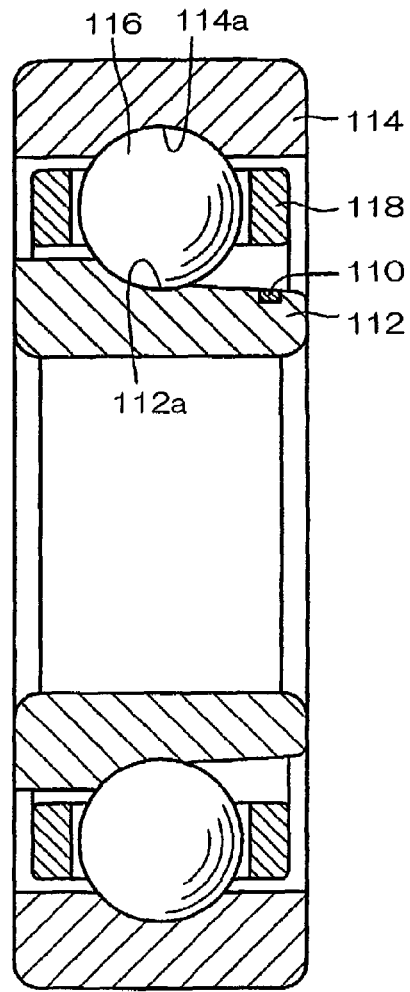
FIG. 2B is a longitudinal sectional view of the angular ball bearing assembly according to the second preferred embodiment of the present invention, showing a modification thereof.

FIG. 2A illustrates, in a longitudinal sectional representation, a second preferred embodiment of the present invention, that is, an angular ball bearing assembly as an example of the machine component. This bearing assembly is made up of major constituent elements including an inner race 112, an outer race 114, a plurality of balls 116 and a ball retainer 118. The inner race 112 has an outer peripheral surface formed with a raceway 112a. On the other hand, the outer race 114 has an inner peripheral surface formed with a raceway 114a. A row of the balls 116 are rollingly interposed between the raceway 112a in the inner race 112 and the raceway 114a in the outer race 114. The balls 116 are retained in a circular row by the ball retainer 118 and spaced equidistantly from each other in a direction circumferentially thereof. In this illustrated embodiment, an IC tag 110 is embedded in one of opposite end faces 114b of the outer race 114. FIG. 2B illustrates the case in which the IC tag 110 is embedded in a portion of the outer peripheral surface of the inner race 112.

Figure 3:
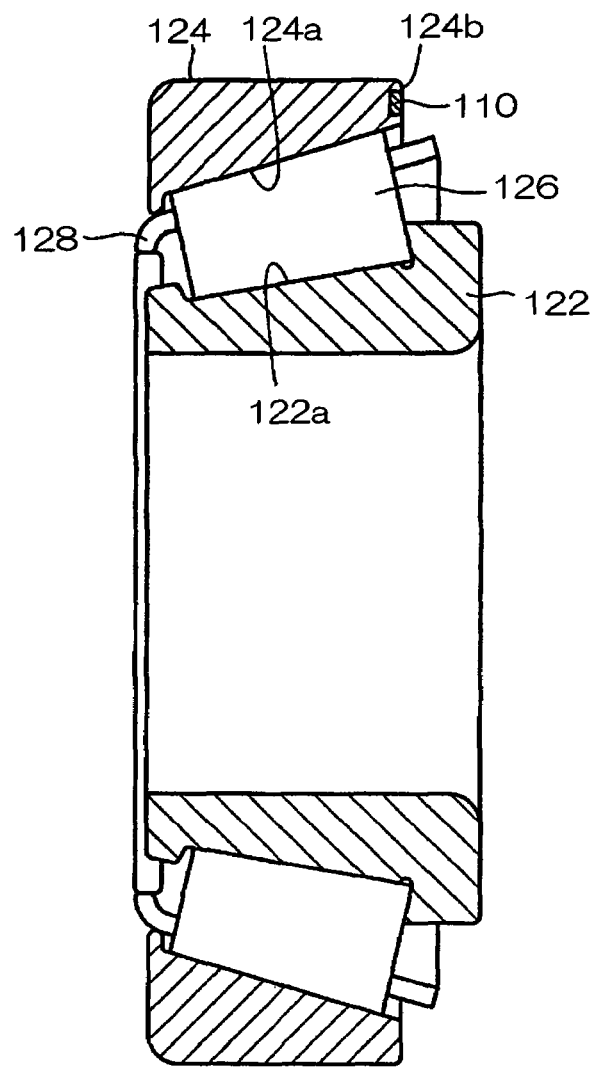
FIG. 3 is a longitudinal sectional view of a tapered roller bearing assembly according to a third preferred embodiment of the present invention.
Figure 4:
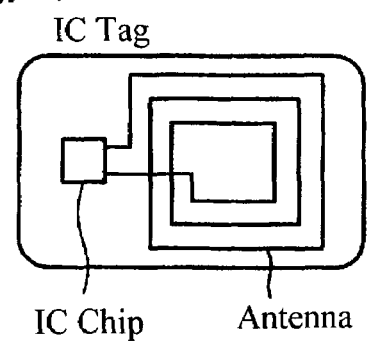
FIG. 4 is a schematic diagram showing an IC tag.

FIG. 3 illustrates, in a longitudinal sectional representation, a third preferred embodiment of the present invention, that is, a tapered roller bearing assembly as an example of the machine component. This bearing assembly is made up of major constituent elements including an inner race 122, an outer race 124, a plurality of tapered rollers 126 and a roller retainer 128. The inner race 122 has an outer peripheral surface formed with a raceway 122a. On the other hand, the outer race 124 has an inner peripheral surface formed with a raceway 124a. A row of the tapered rollers 126 are rollingly interposed between the raceway 122a in the inner race 122 and the raceway 124a in the outer race 124. Those tapered rollers 126 are retained in a circular row by the roller retainer 128 and spaced equidistantly from each other in a direction circumferentially thereof. In this illustrated embodiment, an IC tag 110 is embedded in one of opposite end faces 124b of the outer race 124.

In any one of the foregoing embodiments shown in FIGS. 1 to 3, the IC tag having information unique to the particular machine component recorded therein is embedded in the manner described above, and the IC tag is kept affixed to the machine component throughout the lifetime thereof from shipment to use and to disposal and, therefore, the stock control, delivery management, distribution management, maintenance control or customer management or the like can be established based on the information recorded on the IC tag. By way of example, if the date, on which the machine component is incorporated in a machine is recorded, whether or not the replacement is required can easily be determined based on the duration of use of the machine component.

Also, information on the machine component including the part number, material, serial number, date of manufacture, manufacturing plant, results of examination of such machine component, type of the grease filled and type of seals can be recorded on the IC tag. The manufacturer of the machine component can utilize such information for the process control, stock control and sales management.

By way of example, when it comes to replacement of machine components, which are manufactured at a certain time, on a lot basis by reason of, for example, routine replacement of those components or the presence of defects in those components, a particular lot of the components to be replaced can be identified from the IC tags attached to those component even though the machines utilizing such components cannot be specified, and accordingly the machine components can be replaced in a minimized number of works.

In addition, the information recorded on the IC tag can be utilized to verify the authenticity of machine component and, accordingly, it can contribute to prevent the distribution of copied products and counterfeits. In particular, when a dealer purchases a product, for example, bearing, the manufacturer of the product can be identified and, therefore, it is possible to prevent the customer from purchasing a copied product.

Figure 5:
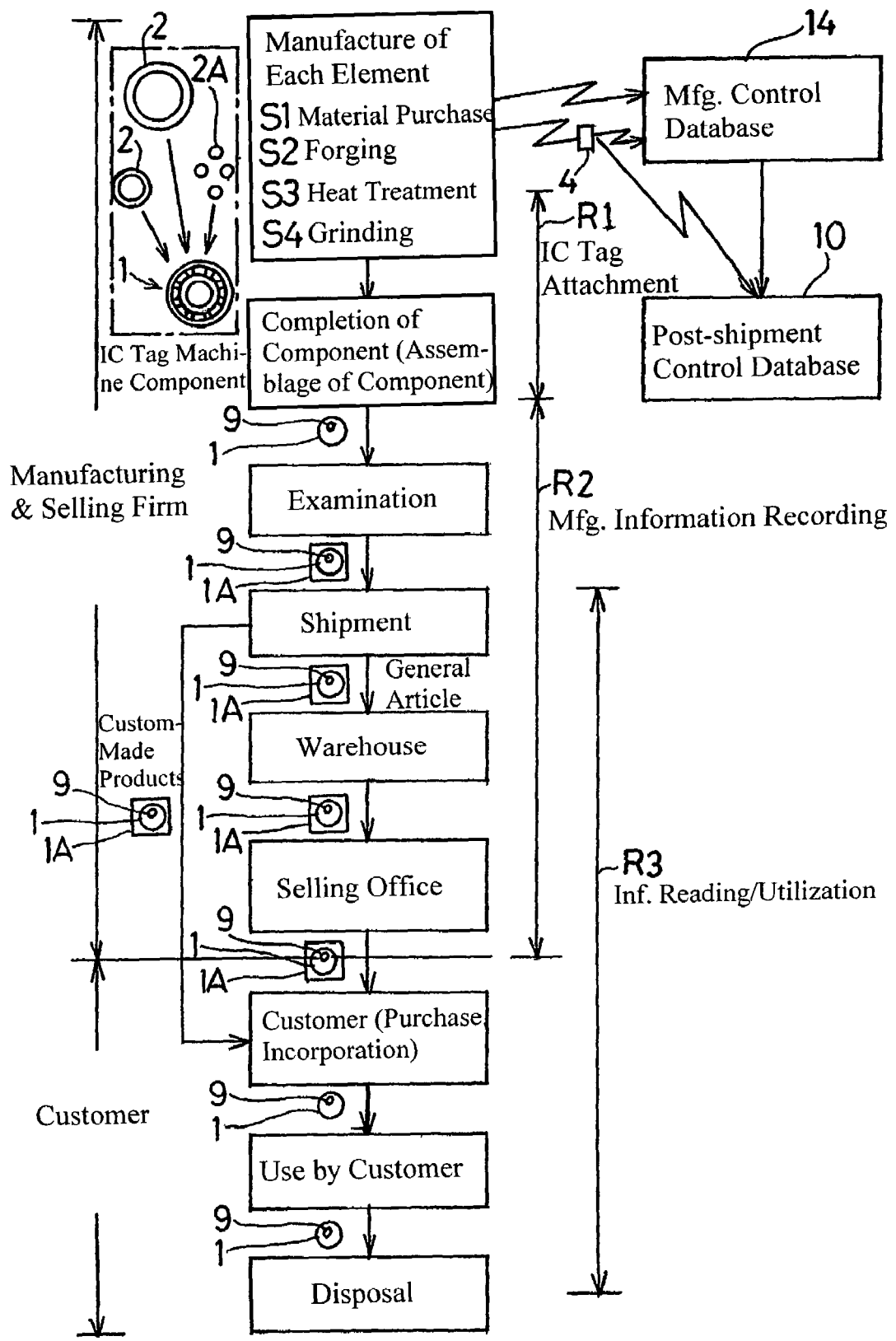
FIG. 5 is an explanatory diagram showing a quality control method for controlling machine components according to fourth and fifth preferred embodiment of the present invention.

Hereinafter, fourth and fifth preferred embodiments of the present invention will be described in detail with particular reference to FIG. 5. FIG. 5 illustrates various stages of the production process from manufacture to disposal of a machine component 1 and, also, how the quality control is performed using the IC tag 9 at each stage of the production process. The quality control method for the machine component includes attaching the IC tag 9 to the machine component 1, recording on the IC tag 9 manufacturing information about the machine component 1 including information on the production process from purchase of materials for the machine component 1 to a forging stage, to a heat treatment stage, to a grinding stage and to an examination stage, and reading out the recorded information from the IC tag 9 to enable the traceability of the machine component 1 for quality control. The IC tag 9 employed is a non-contact IC tag capable of recording and readout. The machine component 1 is an assembly of a plurality of kinds of elements 2 and 2A, one of those elements 2 and 2A being a rolling element. An example of this machine component 1 may include a rolling bearing assembly, a constant velocity universal joint or a similar shaft joint, or a ball screw.

The quality control method for the machine component 1 includes a step R1 of attaching the IC tag, a step R2 of recording manufacturing information and a step R3 of reading and utilizing the recorded information, each of which will now be described under the separate headings.

(Tag Attaching Step R1)

At the step R1, the IC tag 9 is attached to the machine component 2 during the manufacture thereof or at the time of completion of the manufacture thereof. The machine component 1 may be assembled after the IC tag 9 has been attached to one of the elements 2, or the IC tag 9 may be attached to the machine component 1 after the assemblage of the machine component 1 has completed.

(Manufacturing Information Recording Step R2)

At the step R2, by the time of shipment or delivery to a customer, manufacturing information on various stages of the production process of the machine component including purchase of material, a forging stage, a heat treatment stage, a grinding stage and a stage of examination is recorded on the IC tag 9 attached to the machine component 1. The manufacturing information recorded also include information on processing conditions of at least one of the forging, heat treatment and grinding stages. The material purchase, forging, heat treatment and grinding stages for the machine component 1, are those performed on each of the elements 2. The information on the processing conditions includes, for example, the press pressure, the cycle time and other parameters, which are employed during the forging stage; the heat treatment temperature, the heating time and the heating method and other parameters, which are employed during the heat treatment stage; and the rotational speed of a grinding stone, the cutting speed, the feed speed and other parameters, which are employed during the grinding stage. It is preferred that in addition to the processing condition information referred to above, the manufacturing information may include at least one of information concerning the date of manufacture of the machine component 1, the place of manufacture of the machine component 1, the brand of the grease used, the gap size between the elements employed, the term of warranty and handling cautions. Information on various results of examination may also be included preferably in the manufacturing information. Those results of examination may include results of examination on each of the elements 2 and results of examination of the complete product (the machine component 1). Again, other than those pieces of information, the manufacturing information may additionally include information on identification of the machine component 1, which may in turn include identifying information unique to each of the machine components 1 such as the serial number and/or identifying information specific to a particular lot of machine components 1, for example, the lot number. Recording of those pieces of manufacturing information on the IC tag 9 may be carried out all at a time or on a piecemeal basis. By way of example, when assemblage of the machine component 1 completes and the complete product is subsequently examined, some of those pieces of information on the results of examination and examining conditions may be recorded first and the remaining pieces of information may be recorded subsequently, or all of those pieces of information may be recorded all at a time.

(Information Reading and Utilizing Step R3)

At this step R3, at an arbitrarily chosen time subsequent to the shipment, the information recorded on the IC tag 9 is read out and at least the processing condition information is then confirmed.

The flow of the machine component 1 from completion of the manufacture to disposal generally includes, as shown in FIG. 5, the completion of manufacture, examination of the complete product, shipment, storage in a warehouse, storage at business premises, delivery to a customer (inclusive of customer's purchase and incorporation of the machine component 1 into a machine), use by the customer and disposal, all taking place sequentially subsequent to the completion of assemblage of the machine component 1. In the case of a custom-made article, the custom-made article may be delivered directly to a custom immediately after the shipment.

Reading and utilization of the information recorded on the IC tag 9 takes place at any time subsequent to the shipment, depending on the necessity. The necessary information is read out from the IC tag 9 for confirmation. By way of example, in the event that any trouble occurs in the machine component 1 during the use by a customer, some of the information including the material, the performance and others relating to the failed machine component 1 are read out from the IC tag 9 attached thereto for clarification of a cause of the trouble. At this time, if the recorded information contains not only information on the material and the result of examination of each of the elements 2, but also the processing condition information, the trouble shooting can easily and precisely be accomplished.

As an additional utilization that can be available during this information reading and utilizing step R3, available memory in the IC tag 9 can be used for shipment control, stock management, delivery management, maintenance control and others.

According to the quality control method for the machine component, since one of the pieces of processing condition information including the forging stage, the heat treatment stage, the grinding stage and others can be confirmed during the information reading and utilizing step R3 taking place at any desired time subsequent to the shipment, the trouble shooting can be easily performed with respect to the machine component 1 such as a rolling bearing assembly which includes a plurality of elements 2 and the rolling elements 2A and which requires a strict quality and precision. Also, in this quality control method, only the IC tag 9 is used for information management without using database and, therefore, in the facilities where the processing condition information is confirmed, the processing condition information can be read out from the IC tag 9 without communication facilities necessary to make access to the database and the access authority.

In the practice of the fourth embodiment, the IC tag 9 is used to contain as many pieces of the manufacturing information as possible and the quality control is performed based on the recorded information. However, in the fifth preferred embodiment of the present invention, a post-shipment control database may be utilized and is generally identified by 10.

Specifically, the database 10 is used to store in association with the identifying information unique to the machine component 1 predetermined manufacturing information on purchase of material, the forging stage, the heat treatment stage, the grinding stage and the examination stage, so that the stored information in the database 10 can be extracted based on the identifying information. The quality control is carried out by the utilization of the database 10 and the IC tag 9 attached to the machine component 1. In this fifth embodiment, the following processing takes place during the steps R1 to 3.

(IC Tag Attaching Step R1)

This step R1 is substantially identical to that of the fourth embodiment.

(Manufacturing Information Recording Step R2)

At this step R2, by the time of shipment or delivery to a customer, identifying information of the machine component 1 such as serial number and lot number and manufacturing information on the machine component 1 are recorded on the IC tag 9 attached to the machine component 1 based on the database 10. The manufacturing information recorded includes information on processing conditions of at least one of the forging, heat treatment and grinding stages. Since the database 10 is used in this fifth embodiment, the manufacturing information to be recorded on the IC tag 9 may be limited to only information that is convenient to read out directly from the IC tag 9. By way of example, pieces of information concerning the date of manufacture of the machine component 1, the place of manufacture of the machine component 1, the brand of the grease employed therein, the gap size between the elements employed, the term of warranty and handling cautions are preferably recorded on the IC tag 9.

(Information Reading and Utilizing Step R3)

At this step R3, at an arbitrarily chosen time subsequent to the shipment, the information recorded on the IC tag 9 is read out and one of confirmation of the purchased material, confirmation of the manufacturing process, confirmation of the processing condition information thereof, confirmation of the result of examination and others is carried out making reference to the information so read out or to information obtained by collating the information so read out with the database 10. Other utilizations may be carried out based on the IC tag 9 and the database 10.

Even in this quality control method, during the information reading and utilizing step R3 taking place at any desired time subsequent to the shipment, at least one of the pieces of the processing condition information, such as the forging stage, the heat treatment stage, the grinding stage and others, can be confirmed. As such, the trouble shooting can be easily performed with respect to the machine component 1 such as a rolling bearing assembly which includes a plurality of elements 2 and the rolling elements 2A and which requires a strict quality and precision. Also, since the IC tag 9 attached to the machine component 1 contains the identifying information and also the database 10 contains the various pieces of information corresponding to the identifying information, many pieces of information can be stored in and extracted from the database 10 without relying on the limited storage capacity of the IC tag. 9. Also, available memory in the IC tag 9 can be used for storing information about the history management subsequent to the shipment and/or subsequent to the delivery to the customer or the like.

Figure 6:
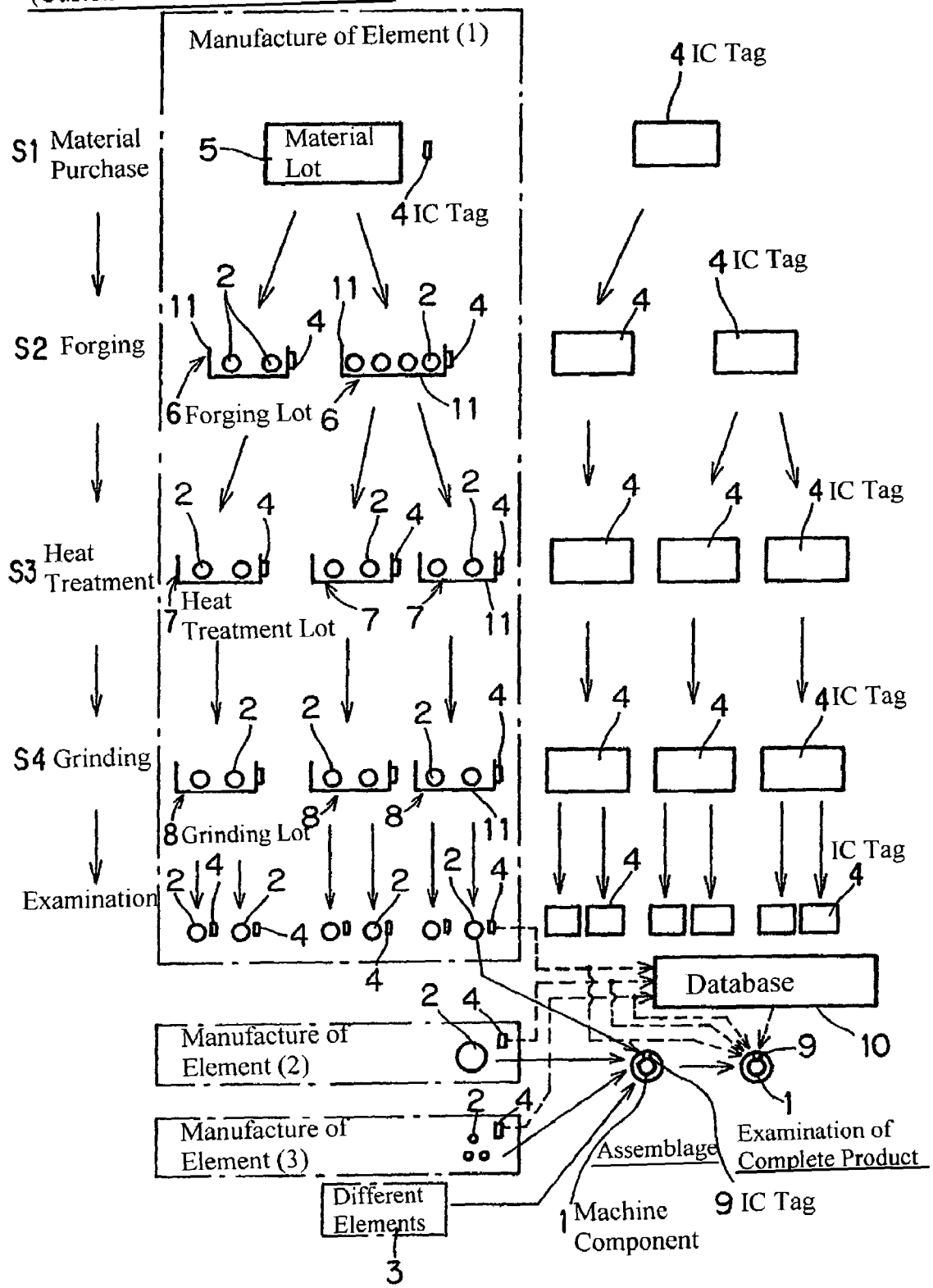
FIG. 6 is an explanatory diagram showing the manner of controlling elements in the quality control method for controlling the machine components.

The details of the quality control method and the database 10 will be described later with particular reference to FIG. 6 and the subsequent drawings.

In any one of the fourth and fifth embodiments, collection of the various pieces of the manufacturing information to be recorded during the manufacturing information recording step R2 may be carried out by recording them in a time-of-manufacture control database 14 and subsequently recording them on the IC tag 9 attached to the machine component 1 or, alternatively, by recording them on a IC tag 4 used during the manufacture, which is different from the IC tag 9 attached to the machine component 1.

A method of recording information in the time-of-manufacture control database 14 includes a step of recording in the time-of-manufacture control database 14 the manufacturing information, corresponding to the lot number of the elements 2 or the identifying number for each of the elements 2, on a manufacturing process of the elements 2 of the machine component 1 including purchase of material, forging, heat treatment, grinding and examination and a step of recording the manufacturing information so recorded in the database 14 on the IC tag attached to the machine component. It is to be noted that the time-of-manufacture control database 14 is provided in one or a plurality of computers (not shown) linked to, for example, a computer network.

While the detail of a method of utilizing the IC tag 4 used during the manufacture will be described later with reference to FIG. 6 and the subsequent drawings, it can be summarized as follows. This method includes a step of recording the manufacturing information on a manufacturing process of the elements 2 of the machine component 1 including purchase of material, forging, heat treatment, grinding and examination, on the IC tag 4 provided for each of the lot numbers of the elements 2, at each stage of the manufacturing process, and a step of reading the recorded manufacturing information from the IC tag 4 and then recording a portion or the whole of the readout information on the IC tag 9 attached to the machine component 1. The manufacturing information to be recorded on the IC tag 4 used during the manufacture includes processing condition information on at least one of the forging stage, the heat treatment stage and the grinding stage.

Figure 7:
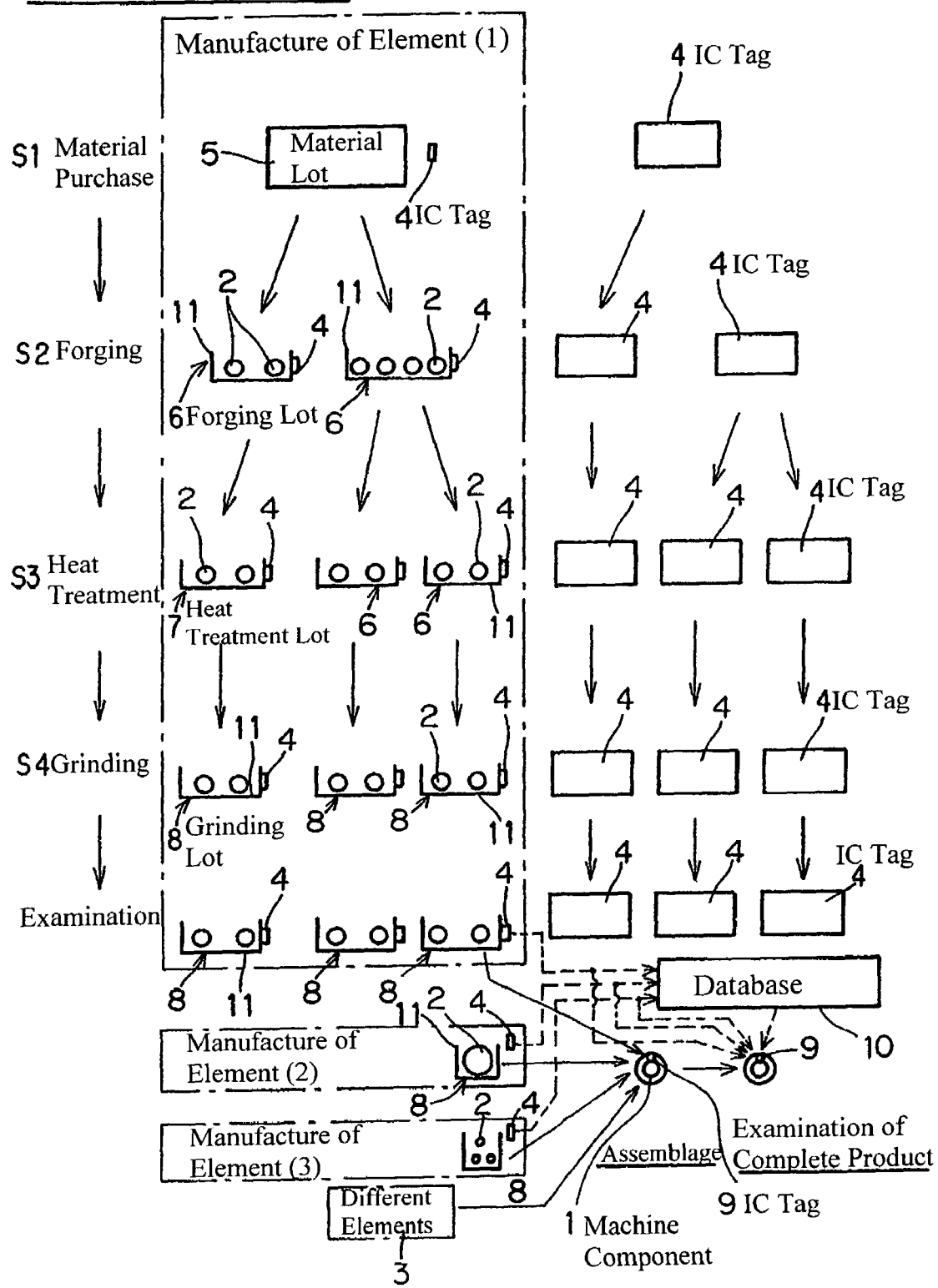
FIG. 7 is an explanatory diagram showing the different manner of controlling elements in the quality control method for controlling the machine components.

A method of utilizing the IC tag 4 for use during the manufacture may vary depending on whether the machine component 1 is individually examined such as is the case with the custom-made product or whether the machine component 1 is examined on a lot basis such as is the case with general products. FIG. 6 illustrates the case with the individually examined products (custom-made products) whereas FIG. 7 illustrates the case with the products examined on the lot basis (general products). Since the individually examined products (custom-made products) and the product examined on the lot basis (general products) are substantially identical with each other, except that they are different from each other in respect of whether the examination after the grinding stage and the examination after the assemblage are carried out individually or on the lot basis, the individually examined products (custom-made products) will first be described and, as to the products examined on the lot basis, only the difference from the individually examined products (custom-made products) will be described subsequently.

Figure 15:
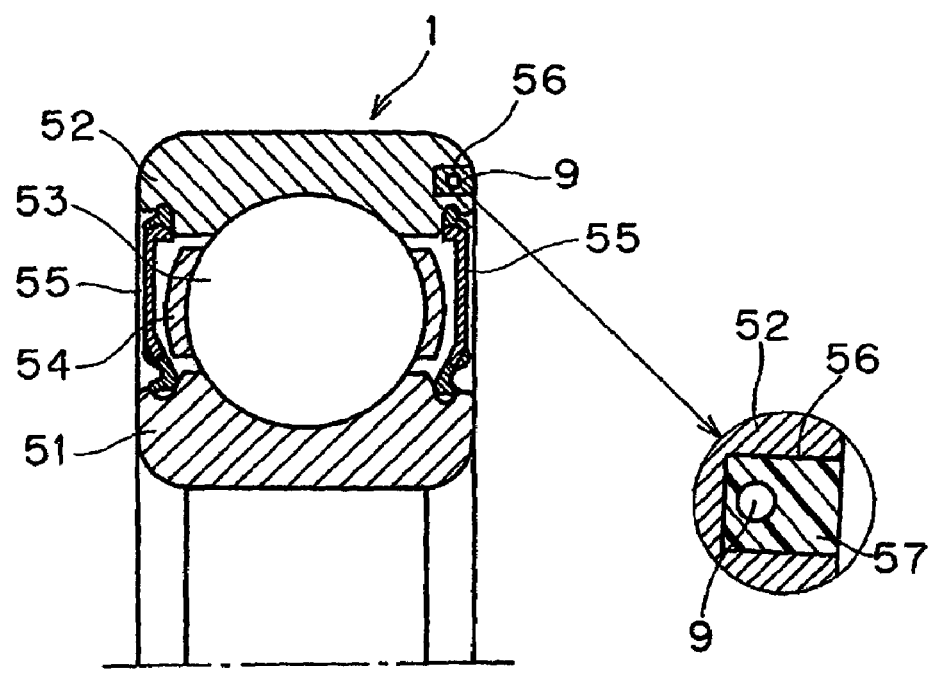
FIG. 15 is a fragmentary longitudinal sectional view of a machine component having an IC tag attached thereto, shown together with a portion thereof on an enlarged scale.

The machine component 1 to be quality-controlled is made by assembling different kinds of elements 2 ((1) to (3)), each of which is manufactured sequentially through a step S1 of purchasing material, a step S2 of forging, a step S3 of heat treatment and a step S4 of grinding. The mechanical product 1 may include, for example, a rolling bearing assembly, a constant velocity universal joint or any other shaft coupling, a ball screw and so on. The elements 2 ((1) to (3)) may, in the case of the machine component 1 being a rolling bearing assembly as shown in FIG. 15, represent an inner race 51, an outer race 52 and rolling elements 53, respectively. The machine component 1 may include elements 3 different from the elements 2 that are manufactured through the material purchasing step S1 to the grinding step S4. In the case of the machine component 1 being a rolling bearing assembly, a retainer 54 and sealing members 55 (FIG. 15) will represent the above mentioned different elements 3.

The flow from the material purchasing step S1 to the grinding step S4 is a general manufacturing flow of how each of the elements 2 is manufactured and each of the steps S1 to S4 is broadly classified. Accordingly, each of those steps S1 to S4 may include a plurality of substeps or include other steps not listed above. In any event, the nomenclatures of those steps S1 to S4 are to be construed as representative of various processing steps of the flow.

This quality control method employs the following levels (1) to (4) for each of the elements 2 ((1) to (3)), but employs the additional level as will be described later for the completed machine component 1. It is to be noted that although the lots in each of the stages S1 to S4 may separate at the downstream manufacturing stage, they are not combined.

(1) Control Level During Material Purchase Stage (S1)

At the time of purchase of the material for each of the elements 2, the material lot number for the corresponding material lot 5 and information concerning the purchased material (4a) are recorded on each of the IC tags 4 prepared for each of the material lots 5.

(2) Control Level During Forging Stage (S2)

The IC tag 4 for the corresponding material lots 5, or a new IC tag 4 having the same information recorded on the IC tag 4 for the corresponding material lot 5 is prepared for each of the forging lots 6. The forging lot number for the corresponding forging lot 6 and information obtained during the forging stage (4b) are recorded on the assigned IC tag 4.

(3) Control Level During Heat Treatment Stage (S3)

The IC tag 4 for the corresponding forging lot 6, or a new IC tag 4 having the same information recorded on the IC tag 4 for the corresponding forging lot 6 is prepared for each of heat treatment lots 7, on which the heat treatment lot number for the corresponding heat treatment lot 7 and information obtained during the heat treatment stage (4c) are recorded.

(4) Control Level During Grinding Stage (S4) and Examination Stage

The IC tag 4 for the corresponding heat treatment lot 7, or a new IC tag 4 having the same information recorded on the IC tag 4 for the corresponding heat treatment lot 7 is prepared for each of grinding lots 8, on which the processing conditions for the corresponding grinding lot 8 are recorded. Also, the IC tag 4 for the corresponding grinding lot 8, or a new IC tag 4 having the same information recorded on the IC tag 4 for the corresponding grinding lot 8 is prepared for each of the elements 2 or a set of the elements 2 of the same kind, which is an examination unit. The corresponding grinding lot number and information obtained during the examining stage (4d) are recorded on those IC tags 4.

To each of the machine components 1 that are made up of the elements 2 ((1) to (3)), the IC tags 9 are attached during a period prior to the assemblage and after the assemblage. At least one of the manufacturing number unique to the individual machine component 1 and the information recorded on the IC tag 4 after the stage of examination of each of the elements 2 ((1) to (3)), for example, the manufacturing number is recorded on the IC tag 9 attached to the machine component 1. In correspondence with the manufacturing number, the information recorded on the IC tag 4 after the stage of examination of each of the elements 2 ((1) to (3)) and the information on examination after the completion of the machine component 1 are recorded in the database 10.

The IC tags 4 employed during each of the stages (S1) to (S4) may be identical throughout those stages, or different IC tags 4 may be employed during those stages, in which case the information recorded on the IC tag used during the preceding stage may be transcribed into the different IC tag used during the following stage. Where the lots separate during the downstream manufacturing stage, a new IC tag 4 is prepared, on which the information recorded during the preceding stage may be transcribed. Alternatively, the IC tags 4 are prepared in advance in a number equal to the total number of lots used throughout the manufacturing process and information can be recorded and overwritten on the same IC tags 4 throughout the process.

Figure 8:
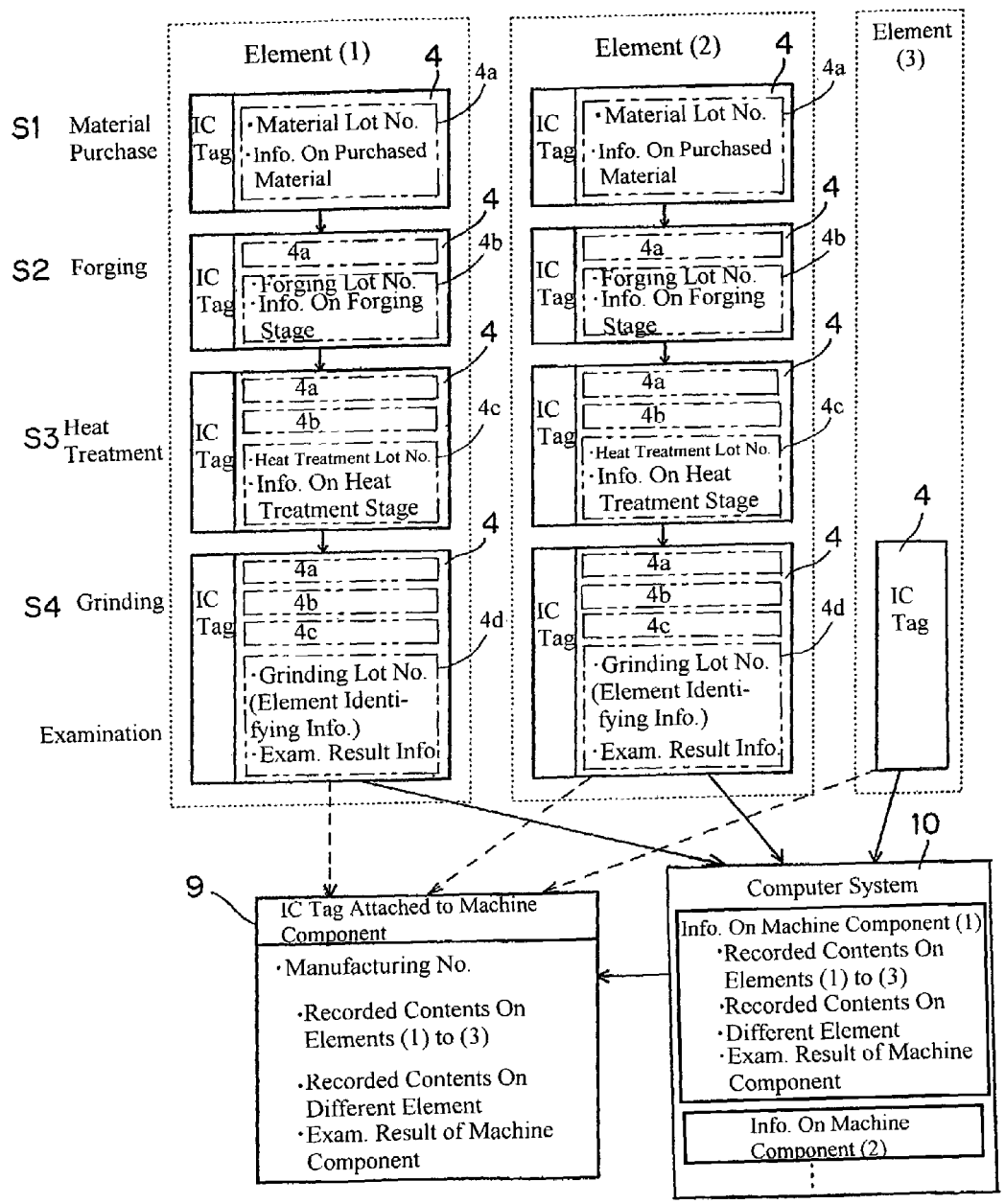
FIG. 8 is an explanatory diagram showing how contents recorded on each of the IC tags change.

Throughout the stages (S1) to (S4), the lot number and the information on the preceding stage are combined on the IC tag 4 with the lot number and the information on the following stage, as shown in FIG. 8.

In each of the stages, the IC tag 4 is attached to, for example, a transport container 11 accommodating the elements 2. The container 11 may be, for example, a cage, box or pallet. In such case, the IC tag 4 may be attached directly to the container 11 or may be attached to a visual identifying tag 12 attached to the container 11. Also, the IC tag 4 may be removably attached to the container 11. When the IC tag 4 is attached to the container 11, the IC tag 4 can easily be handled since the IC tag 4 prepared for each of the lots can be always carried with the elements 2 of the lot. In addition, recording of the information on the IC tag may be carried out along a path of transport 13 of the elements 2 by means of, for example, a conveyor.

The details of each of the control levels will now be described.

(1) Control Level at the Time of Purchase of Material

The material is generally purchased in the form of steel ingots, steel plates, steel tubes, steel wires or the like. The materials purchased are quality examined, for example, for each of material lots. Information on the purchased material that is recorded on the IC tag 4 at this control level can be classified into information on the origin and information on the quality. The origin information is descriptive of the name of a selling company, the place of a factory of such selling company and so on. On the other hand, the quality information is descriptive of the hardness of structure, inclusions of non-metallic material and so on. This quality information is such that although the results of examination of the materials conducted after the purchase of the materials are recorded on the IC tag, the information obtained from the selling company can be recorded, or the both may be recorded. A method of recording the information on the IC tag 4 in this control level may be carried out by recording on the IC tag 4 the information made available from, for example, a purchase control computer (not shown) through means of a recording terminal.

(2) Control Level at the Forging Stage (S2)

Figure 11:
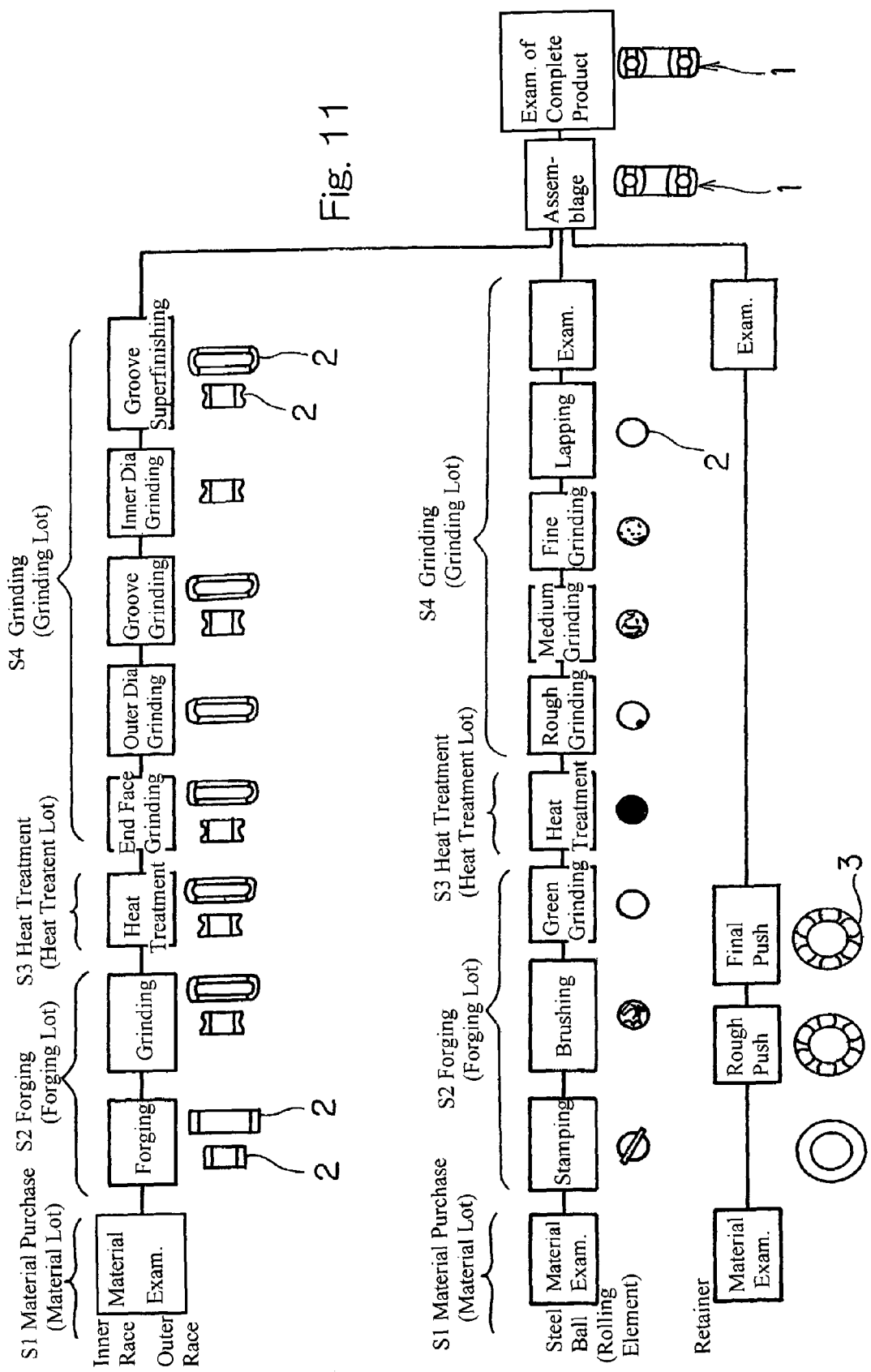
FIG. 11 is an explanatory diagram showing how each of the machine components is assembled.

The forging stage (S2) varies depending on the kind of the machine component 1 and/or the kind of each of the elements 2. FIG. 11 illustrates the manufacturing process for manufacturing the elements 2 in the case where the machine component 1 is a rolling bearing assembly. In the case of the elements 2 being an inner race and an outer race, the forging stage (S2) includes forging of the material to form the inner and outer races 2 of a rough shape and turning of the forged products. In the case of the elements 2 being rolling elements such as steel balls, the forging stage (S2) includes stamping, brushing and green grinding.

Recording of the information on the IC tag 4 in the forging stage (S2) may be carried out either all at a time for the entire process of the forging stage (S2), or on a piecemeal basis for each of sub-stages of the forging stage (S2). By way of example, if the elements 2 are an inner race or an outer race of the rolling bearing assembly and if forging and turning are carried out as shown in FIG. 11, information on the width, inner diameter, groove size and chamfering size all measured after the turning is recorded on the IC tag 4. If the elements 2 are a rolling element and if they are processed through the forging sub-stages shown in FIG. 11, information on the size, strain and appearance after the stamping is recorded and, also, information on size, roundness and appearance measured after the brushing and also after the green grinding is recorded. Processing condition information is also recorded.

Figure 9:
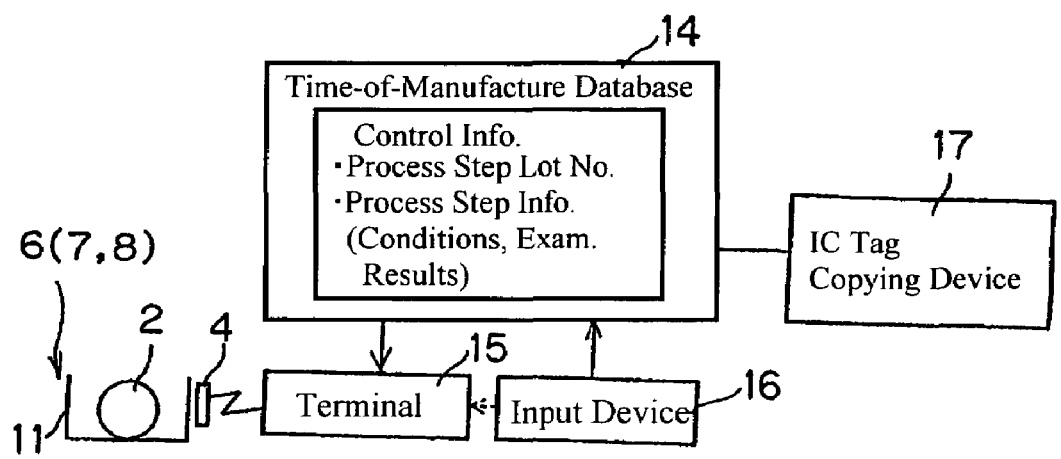
FIG. 9 is a conceptual explanatory diagram showing the manner of recording information on the IC tag during manufacture of the elements.

A method of recording the information on the IC tag during this forging stage is carried out by the tome-of-manufacture database 14 used for the process control in each of the substages of, for example, the forging stage (S2), or used for the examination control, by way of the terminal 15. Information that is required for an operator to input manually is recorded from an input device 16 such as a keyboard as shown in FIG. 9 or directly from the terminal 15 through the time-of-manufacture control database 14.

Where the number of the forging lots 6 becomes greater than the material lots 6 of the preceding stage, new IC tags 4 are made available, on which the information recorded on the IC tags 4 for the material lots 5 are then transcribed or copied using an IC tag copying device 17. The information on the forging stage is then recorded on the new IC tags 4 having the information on the material lot 5 copied. Even in each of the subsequent stages, the procedure similar to the foregoing is employed to transcribe the information onto the new IC tags 4 where the number of lots increases in the subsequent stages.

(3) Control Level at Heat Treatment Stage (S3)

When the heat treatment is carried out, examination takes place subsequently. In the case where the elements 2 are an inner race or an outer race of the rolling bearing assembly, the harness, the presence or absence of deformation, the structure and so on are tested. In the case where the elements 2 are a rolling element, the hardness, the structure and so on are tested. Information on the heat treatment includes results of those tests. Other than this information, heat treatment conditions and others may be recorded.

(4) Control Level at Grinding Stage (S4) and Subsequent Examination Stage

The grinding stage (S4) may vary depending on the kind of the machine component 1 and the kind of the elements 2. Where the elements 2 are an inner race or an outer race of the rolling bearing assembly, the grinding stage (S4) may include end face grinding, outer diameter grinding, groove grinding, inner diameter grinding, groove superfinishing, and so on as shown in FIG. 11. On the other hand, where the elements 2 are a rolling element of the rolling bearing assembly, rough grinding, medium grinding, fine grinding, lapping and such others are performed. Completed products in each of those sub-stages are examined. Information recorded on the IC tag 4 includes processing conditions for each of the sub-stages during the grinding stage (S4) and the like. The information on those processing conditions may include, for example, the kind of a grinding stone, the grinding speed and others. After completion of the grinding stage, examination or test is conducted, results of which are recorded on the IC tag 4. Information on the results of the examination may include various dimensions, for example, the size, width variation, appearance and others in the case of the end face grinding of the inner and outer races, outer diameter, roundness, cylindricity, appearance and others in the case of the outer diameter grinding of the outer race and; the dimension at a portion subjected to the grinding, roundness, radial oscillation, axial oscillation, difference in groove center and others in the case of the groove grinding of the inner and outer races. In the case of the inner diameter grinding of the inner race, the information includes the size of the inner diameter, roundness and others. In the case of the groove superfinishing of the inner and outer races, the information includes the appearance and others. Where the elements 2 are rolling elements, the information on results of examination after the rough grinding or any other sub-stages during the grinding stage (S4) includes the size, roundness and others. The information on the results of examination of the completed elements 2 after the grinding stage (S4) includes the appearance, dimensions, sphericity, difference in diameter, hardness, acoustic test results, microscopic test results and others.

During the grinding stage (S4), 100% examination is carried out in the case of the custom-made products, in which case the IC tags 4 are prepared in a number equal to the number of the elements 2 and are recorded with such information as the grinding lot number, the individual results of examination and others for the corresponding elements 2. In addition to the grinding lot number, the number necessary to identify the individual elements 2 may be additionally recorded. In the case where the elements 2 are used in a large number in a single machine component 1 such as the rolling elements in a rolling bearing assembly, a set of the elements used in the single machine component 1, or a set of the elements 2 used at the same location of the single machine component 1 (for example, for each row in a dual row bearing assembly) may be considered as a single element 2 and one IC tag 4 is prepared for recording information on each set.

Control Level at Assemblage of Machine component 1 and Thereafter

The elements 2 so manufactured as hereinbefore described are assembled into the machine component 1 during the assembling stage. The IC tag 9 is attached to the machine component 1 at any desired time during the assembling stage. In other words, the IC tag 9 may be attached to one of the elements 2 either prior to the assemblage or subsequent to the assemblage. This IC tag 9 may be attached to an interior of the machine component 1 or a surface of the machine component 1. The IC tag 9 attached to the machine component 1 should be small in size enough to secure the functioning and/or handling of the machine component 1. An IC tag of a size not greater than 1 mm is now commercially available, and the IC tag 9 attached to the machine component 1 preferably has such size. FIG. 15 illustrates the manner of attaching the IC tag 9 to the machine component 1 which may be a rolling bearing assembly. The IC tag 9 is embedded within a mounting pocket 56 defined in an end face of an outer race 52 and molded with a synthetic resin 57. Mounting of this IC tag 9 is carried out, for example, after the grinding stage (S4) of the outer race 52 and before the assembling stage. It is to be noted that the IC tag 9, instead of being attached to the outer race 52, may be attached to any one of an inner race 51, a retainer 54, a sealing member 55 and others.

After the assemblage, the machine component 1 is examined as a complete product. This examination is carried out after the IC tag 9 has been attached thereto, but may be carried out before the IC tag 9 is attached, depending on the manner of attaching the IC tag 9. Where the machine component part 1 is a rolling bearing assembly, items of examination effected to the assembled machine component 1, for example, includes an outer race, inner diameter, outer diameter, axial width, roundness, cylindricality, radial oscillation, axial oscillation, lateral oscillation, gap, acoustics. All of the machine components 1 are individually examined in the case where they are a custom-made product.

Figure 10:
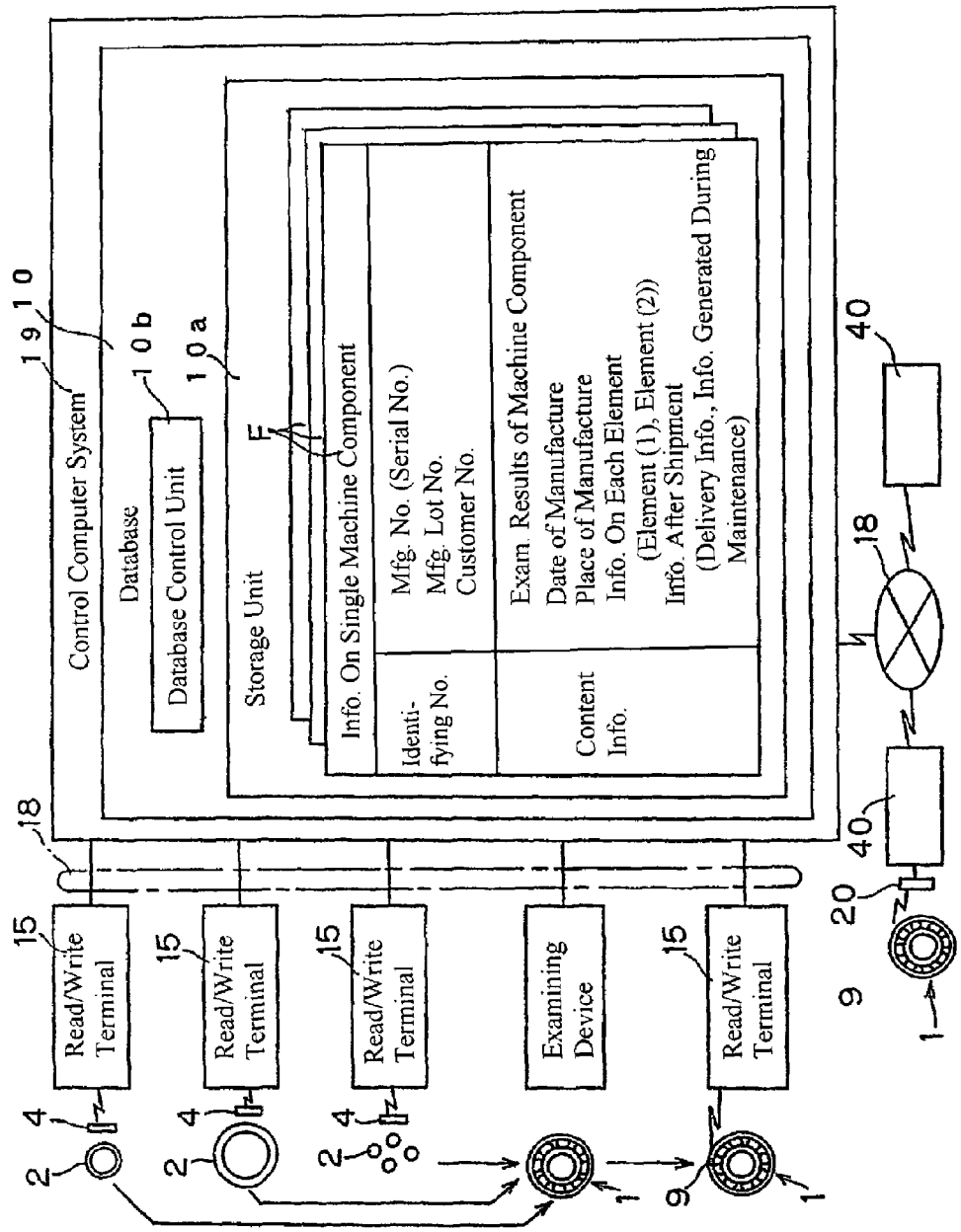
FIG. 10 is an explanatory diagram showing the relation between database and the IC tag.

During the assemblage of the machine component 1, the information recorded on the IC tag 4 attached to each of the elements 2 forming the machine component 1 is recorded in a database 10 in correspondence with the manufacturing number of the machine component 1 as shown in FIG. 10. Also, the results of examination obtained during the examination of the completed product are recorded in the database 10 in correspondence with the manufacturing number of the machine component 1. The manufacturing number is a number unique to the individual machine component 1 and is represented by, for example, the serial number. Where the machine component 1 contain a different element (for example, a retainer) 3 which does not pass through the above described manufacturing stages, information on this different element 3 is equally recorded in the database 10.

The IC tag 9 attached to the machine component 1 in the manner described above contains at least the manufacturing number. In addition to the manufacturing number, this IC tag 9 may also contain the information recorded on the IC tag 4 attached to each of the elements 2 and the result of examination of the complete product (the assembled machine component 1). Where the result of examination of the completed product is recorded on the IC tag 9 attached to the machine component 1, the results of examination are recorded on the IC tag 9 during the examining stage and such information may be transcribed from the IC tag 9 onto the database 10. Yet, the IC tag 9 may be attached to not only the machine component 1, but also a packaging container 1A (FIG. 5) for the machine component 1.

The database 10 is provided in a control computer system 19 placed in the environment of a computer network 18 as shown in FIG. 10. The information F on each of the machine components 1 is recorded on a storage unit 10a of this database 10. The computer network 18 may be a broadband network such as Internet or a combination of the broadband network with a local area network established within the premises of a factory or plant. The database 10 includes the storage unit 10a and a database control unit 10b operable to interface with the storage unit 10a and also to control searches. The database 10 may be provided as a conceptually single database for quality control, or may be a combination of databases physically separated, or may be a type capable of sharing the information with any database employed for any other purpose. For example, the database 10 may be an aggregation of a plurality of computers distributed in the computer network 18 or may share the information with the time-of-manufacture control database 14 or a database for the control of technical information.

Through the network 18, the database 10 is connected with various information processing instruments installed within the premises of the factory or information processing instruments 40 installed in, for example, technical departments of a company, warehouses, business offices, customer's business offices and/or connected with portable or mobile terminals.

According to the quality control method, since the history information from purchase of the material for the elements 2 to results of examination of the completed machine component 1 is stored in the control computer system 10 and the manufacturing number is recorded on the IC tag 9 attached to the machine component 1, checking of the manufacturing number with the control computer system 10 makes it possible to trace and control the relation between the history information and the machine component 1 on one-to-one basis. For example, at any desired time after shipment, a user of the machine component 1 or a maintenance service worker can have the history information on the machine component 1. The information accumulated through each of the manufacturing stages of the elements 2 is recorded on the IC tags 4, provided on a lot basis in each of the manufacturing stages, together with the lot numbers and, therefore, the detailed history information can be controlled. Accordingly, in the event that the defective product is found, replacement of the defective product, identification of a batch containing the defective product, and future's countermeasures for improvement can easily be accomplished and lifetime diagnosis and an advance replacement in anticipation of a trouble in the machine can be facilitated.

Since the information obtained during each of the manufacturing stages is recorded on IC tag 4 prepared for each lot in the respective manufacturing stage, detailed information can be easily recorded as compared with recording on a check sheet by handwriting. Also, since unlike inputting information from, for example, the terminal into the computer, it is the IC tag where the information is inputted, visual recognition is possible, an inputting work is clear and an error will hardly occur. Also, since unlike recording in a computer the various and numerous pieces of information on the manufacturing process at every stage ranging from the purchase of material to the grinding for the elements 2, those piece of the recorded information is carried by the IC tag 4 at each stage of the manufacturing process, the computer is rather less loaded and the control can be facilitated. For this reason, it is possible to achieve an easy control of the detailed information.

Also, since the manufacturing number of the machine component 1 is recorded on the IC tag 9 attached to such machine component 1, the storage area remaining in this IC tag 9 can be used freely and can be used for various applications after the manufacture, for example, shipment control, marketing control, customer control, maintenance control and so on.

The machine component 1 is, after having been assembled, examined and shipped, generally transported to a warehouse and then delivered to a customer through a delivery office as described with reference to FIG. 5. In the case of the custom-made products, they may be delivered directly to the customer after the shipment. The customer will install the machine component 1 into an equipment and will dispose of it when the lifetime expires. At every stage of use of the equipment in the premises of the customer, not only can the history information be ascertained by reading the manufacturing number recorded on the IC tag 9 attached to the machine component 1, but also the storage area left unoccupied in the IC tag 9 can be utilized for various purposes. By way of example, the customer may record on and read from the IC tag 9, pieces of information including, for example, the date of incorporation, the date of inspection, the date of replacement.

In the next place, the case in which the machine component 1 is a product examined by the lot-by-lot sampling inspection procedure like general products will be described with particular reference to FIG. 7. This control of the products to be examined, i.e., lot examined products, on a lot basis includes the following control levels (1) to (4') so long as the elements 2 ((1) to (3)) are concerned and, so long as the machine component 1 assembled with those elements 2 is concerned, the following control levels are taken as will be described later. The control levels (1) to (3) from material purchase to heat treatment previously described in connection with the individually examined products are equally applicable to the lot examined products and, therefore, those control levels (1) to (3) will not be reiterated for the sake of brevity.

(1) Control Level at the Time of Purchase of Material (S1):
(2) Control Level at the Forging Stage (S2):
(3) Control Level at the Heat Treatment Stage (S3):
(4') Control Level at the Grinding Stage (S4) and Subsequent Examination Stage At the examination stage subsequent to the grinding stage (S4), the IC tag 4 for the corresponding heat treatment lot 7 or a new IC tag 4 having the same information recorded on the IC tag 4 for the corresponding heat treatment lot 7, is prepared for each of grinding lots 8. The grinding lot number associated with the grinding lot 8 and information obtained during the examination stage are recorded on those IC tags 4. The sub-stages taken during the grinding stage (S4) are identical in the lot examined products and the individually examined products. While the information recorded during this control level (4') contain results of examination for each grinding lot 8, the items to be taken into account in the examination are identical in the lot examined products and the individually examined products. Although the items of the examination may be different between the lot examined products and the individually examined products, recording of the results of examination on the IC tags 4 should be carried out in both the lot examined products and the individually examined products regardless of the difference in item to be taken into account.

Assemblage of Machine Component 1 and Subsequent Control Level

To the machine components 1 each assembled with the elements 2, the IC tags 9 are attached at any desired time during the assemblage. Of the manufacturing lot number of the machine components 1 and the information recorded on the IC tags 4 after the stage of examination of the elements 2 ((1) to (3)) employed to form the machine component 1, at least the manufacturing lot number is recorded on each of those IC tags 9 attached to the respective machine components. Also, the information recorded on each of the IC tags 4 after the stage of examination of the elements 2 ((1) to (3)) and the information on examination of the machine component 1 after the assemblage are recorded in the database 10 in correspondence with the manufacturing lot number of such machine component 1.

It is to be noted that the control of the lot examined product is substantially similar to that of the individually examined products, unless specified.

In the case of this control method, since the control of the machine components 1 is carried out for every manufacturing lot, the one-to-one control between the individual machine component 1 and the history information is not accomplished, unlike the individually examined machine components 1. Except for this, the control method for the lot examined product and the control method for the individually examined product are identical in terms of effect and advantage. Using the manufacturing lot number obtained from the IC tag 9 attached to the lot examined machine component 1, the history information on such machine component 1 can be obtained and controlled.

Figure 12:
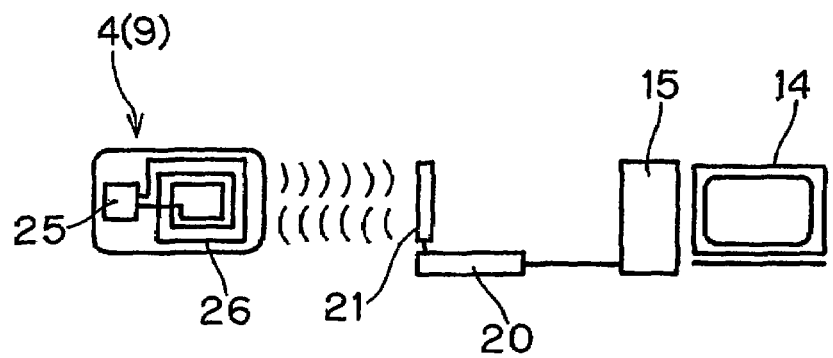
FIG. 12 is an explanatory diagram showing the relation between the IC tag and a tag reader/writer.
Figure 13:
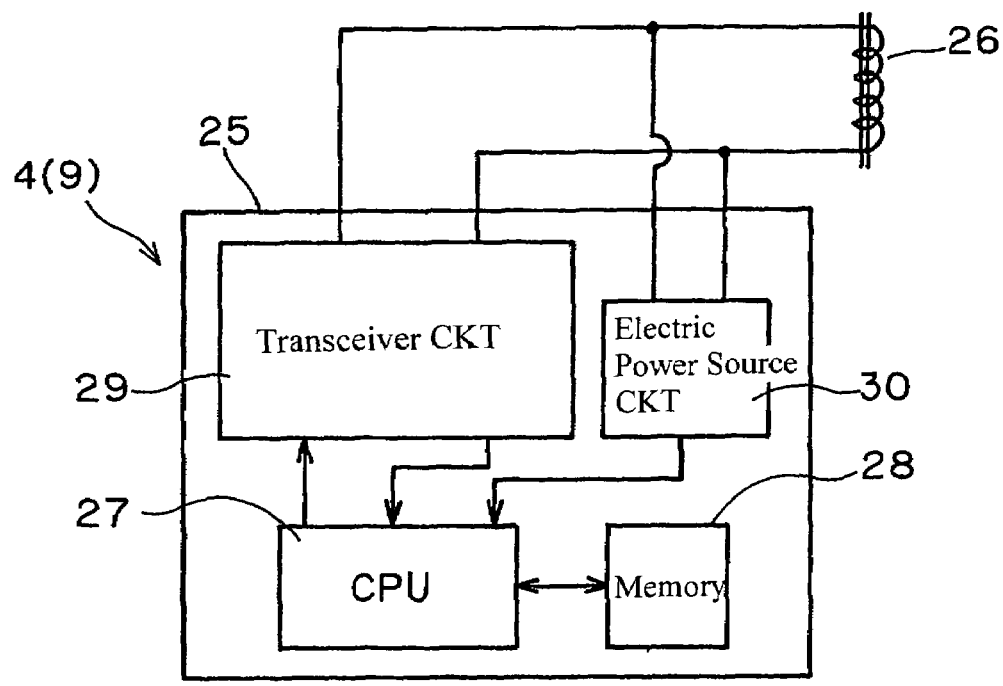
FIG. 13 is a circuit block diagram showing an electrical circuit employed in the IC tag.
Figure 14:
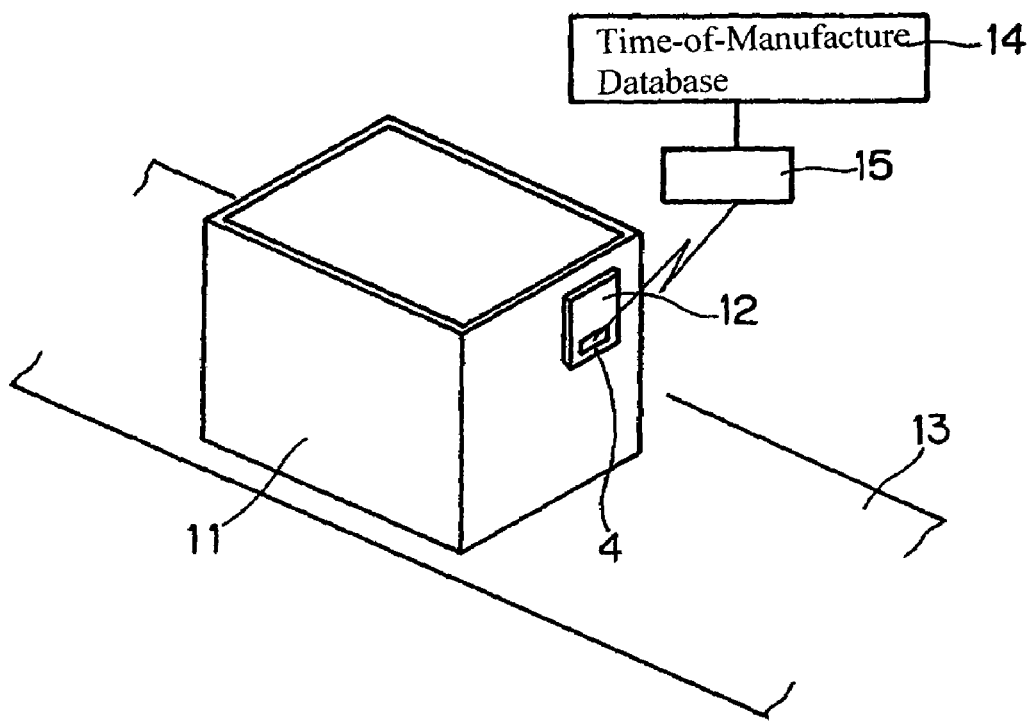
FIG. 14 is an explanatory diagram showing a container for the elements and a conception of how information is written in the IC tag attached to such container.

The details of the IC tags 4 and 9 used in the foregoing control methods will now be described with reference to FIG. 12. Recording and reading of the information on and from the IC tags 4 and 9 are carried by the use of an IC tag reader/writer 20. The IC tag reader/writer 20 includes an antenna 21 oriented towards the IC tags 4 and 9. The IC tags 4 and 9 is of a type on or from which the information can be recorded or read out on a non-contact basis and includes an IC chip (chip of an integrated circuit) 25 and an antenna 26. The IC chip 25 and the antenna 26 are integrally enclosed together with a synthetic resin (not shown). The IC tags are available in numerous types, shapes, sizes and storage capacities. Some of them are available in the form of a rod or a squared or spherical article of a size not greater than, for example, 1 mm, but depending on the size and/or the type of the object to which it is attached, a proper IC tag should be selected. The IC tag 4 used in the control of the element 2 may have a relatively large size since it is attached to the container 11, but the IC tag 9 attached to the machine component is preferably small in size. For the IC tags 4 and 9, an FRID tag, for example, can be conveniently utilized, which employs the RFID (Radio Frequency Identification) technology. The FRID IC tag makes use of a transmission system utilizing, for example, electrostatic coupling, electromagnetic coupling, electromagnetic induction, microwaves or optical beam. Any of those transmission systems may be employed for the FRID IC tag used in the practice of the present invention, but the electromagnetic induction system is preferred. Also, the IC tag that can work satisfactorily even though a metallic matter exists around it is available in the market. Such IC tag is preferably attached to the machine component 1. An example of an electric circuit employed in the IC tags 4 and 9 is shown in FIG. 13. Each of the IC tags 4 and 9 includes a central processing unit (CPU) 27, a storage memory 28, a transceiver circuit 29 and an electric power source circuit 30. The electric power source circuit 30 is activated with an electric power received by the antenna 26. The storage memory 28 is of a type that requires no electric power source for the storage of the information.

It is to be noted that although in describing any one of the foregoing embodiments of the present invention, reference has been made to the rolling bearing assembly as the machine component 1, the control method of the present invention can be equally applied to any machine component 1 assembled with a plurality of kinds of elements 2 that are manufactured through the forging, heat treatment and grinding stages subsequent to the purchase of the material therefor.

Figure 16:
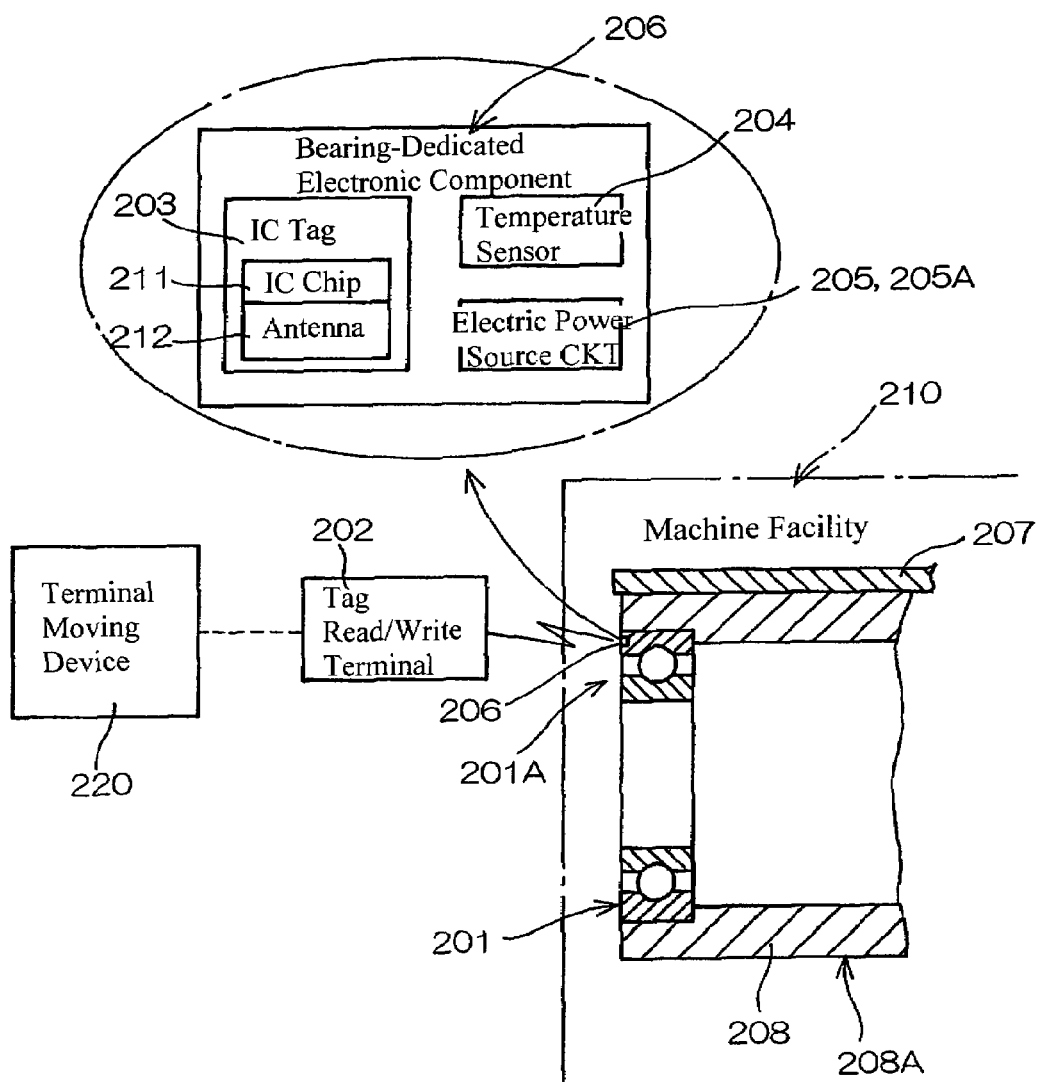
FIG. 16 is a block diagram showing a conception of an abnormality detecting system for an IC tag and sensor equipped bearing assembly, in accordance with a sixth preferred embodiment of the present invention.

A sixth preferred embodiment of the present invention will now be described. As shown in FIG. 16, an abnormality detecting system is shown to work with a rolling bearing 201 incorporated in a machine facility 210, which assembly 201 represents an IC tag and sensor equipped bearing assembly 201A having an IC tag attached thereto. The abnormality detecting system includes a tag read/write terminal 202. The IC tag and sensor equipped bearing assembly 201A is the rolling bearing 201 provided with an IC tag 203, a temperature sensor 204 and electric power source circuits 205 and 205A. The electric power source circuits 205 and 205A are built in the IC tag 203 or separate from the IC tag 203 and are electrically powered from the outside of the bearing assembly 201A on a non-contact basis to drive the temperature sensor 204.

The machine facility 210 is a facility having a plurality of rolling bearing 201 and each of those bearing assemblies 201 is shown as the IC tag and sensor equipped bearing assembly 201A. Specifically, the machine facility 210 may be a conveyor line made up of, for example, belt conveyors or roller conveyors. FIG. 16 illustrates application of the present invention to the belt conveyor line. In this illustrated example, the rolling bearings 201 incorporated in respective rollers 208 used to support an intermediate region of the belt 207 in a lengthwise direction of the belt 207 are each used as a IC tag and sensor equipped bearing assembly 201A. The rollers 208 and the bearing 201 disposed in each of opposite ends of the roller 208 altogether constitute a bearing unit 208A. An inner race of the rolling bearing 201 is mounted on a roller support shaft secured to a conveyor frame (not shown in FIG. 16).

The tag read/write terminal 202 is movably arranged along a row of the IC tag and sensor equipped bearing assemblies 201A and is driven by a terminal moving device 220. This tag read/write terminal 202 may be of a hand-held type so that the attendant worker can carry it to move along the row of the IC tag and sensor equipped bearing assemblies 201A.

The IC tag 203 is made up of an IC chip 211 and an antenna 212. The IC chip 211 and the antenna 212 are mounted on a common substrate (not shown) and are encased with a synthetic resin (not shown). The IC tag 203 is available in numerous types, shapes and sizes; some of them are available in the form of a plate, a rod, a squared or spherical article of a size not greater than, for example, 1 mm and some of them have different storage capacities, but depending on the object to which the IC tag 203 is attached, a proper size and type should be selected. The IC tag 203 may be an FRID tag employing the RFID (Radio Frequency Identification) technology. The FRID IC tag 203 makes use of a transmission system utilizing, for example, electrostatic coupling, electromagnetic coupling, electromagnetic induction, microwaves or optical beam and any of those transmission systems may be employed for the FRID IC tag 203, but the electromagnetic induction system is employed in the illustrated embodiment. Also, the IC tag that can work satisfactorily even though a metallic matter exists around it is also available in the market and, therefor, such IC tag 203 is preferably attached to the bearing 201.

Figure 17:
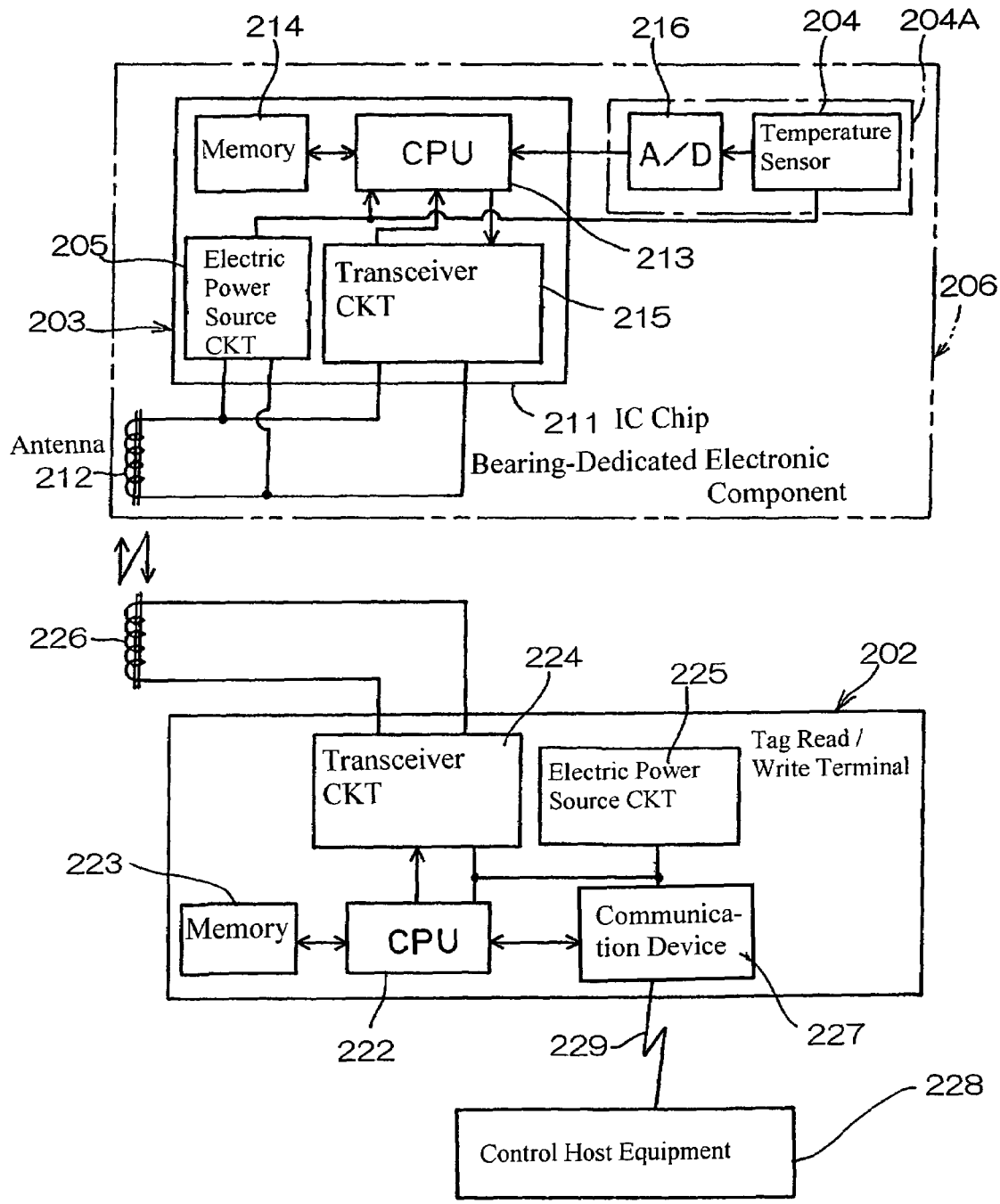
FIG. 17 is a circuit block diagram showing an electronic device forming a part of the abnormality detecting system and mounted on a bearing assembly, shown together with a tag writing terminal.

FIG. 17 illustrates a circuit block diagram showing an example of the bearing dedicated electronic component 206 having the IC tag 203 attached thereto and an example of the tag read/write terminal 202. The IC chip 211 of the IC tag 203 has a central processing unit (CPU) 213, a storage memory 214, a transceiver circuit 215 and an electric power source circuit 205. The electric power source circuit 205 is activated with an electric power received by the antenna 205. The electric power source circuit 205 is used not only to drive the various parts of the IC tag 203, but also to drive the temperature sensor 204. The storage memory 214 is of a type that does not require an electric power for the storage of information.

The bearing dedicated electronic component 206 can be easily handled in a unitary structure including the IC tag 203 and the temperature sensor 204 mounted on the common substrate. An output from the temperature sensor 204 is connected to, for example, a predetermined input terminal (not shown) of the IC tag 203. Where the output from the temperature sensor 204 is an analog signal, it is outputted to the IC tag 203 and others through an analog-to-digital (A/D) converter 216 operable to convert the analog signal into a digital signal. The A/D converter 216 is mounted on the common substrate (not shown) together with the temperature sensor 204 and, hence, the temperature sensor 204 and the A/D converter 216 altogether form a converter equipped temperature sensor 204A. An output from this converter equipped temperature sensor 204A is connected to the central processing unit 213 of the IC tag 203 in the illustrated embodiment, but may be connected to the transceiver circuit 215.

The tag read/write terminal 202 is capable of transmitting/receiving signals and supplying an electric power both on a non-contact basis to and from the IC tag 203. This tag read/write terminal 202 includes a central processing unit (CPU) 222, a storage memory 223, a transceiver circuit 224, and an electric power source circuit 225. Transmitting and receiving signals between the central processing unit 222 and the IC tag 203 takes place through an antenna 226 and the transceiver circuit 224. The tag read/write terminal 202 also includes a communication device 227 connected through a communication path 229 to a computer which serves as a control host equipment 228. The communication path 229 may be either a mere cable or a radio communication line, or a local area network, Internet or any other broadband network.

The control host equipment 228 has a control system for controlling the servicing and maintenance of all of the bearings 201 employed in the machine facility 210. This control host equipment 228 may control the servicing and maintenance of the bearings 201 of a plurality of machine facilities 210.

Figure 18:
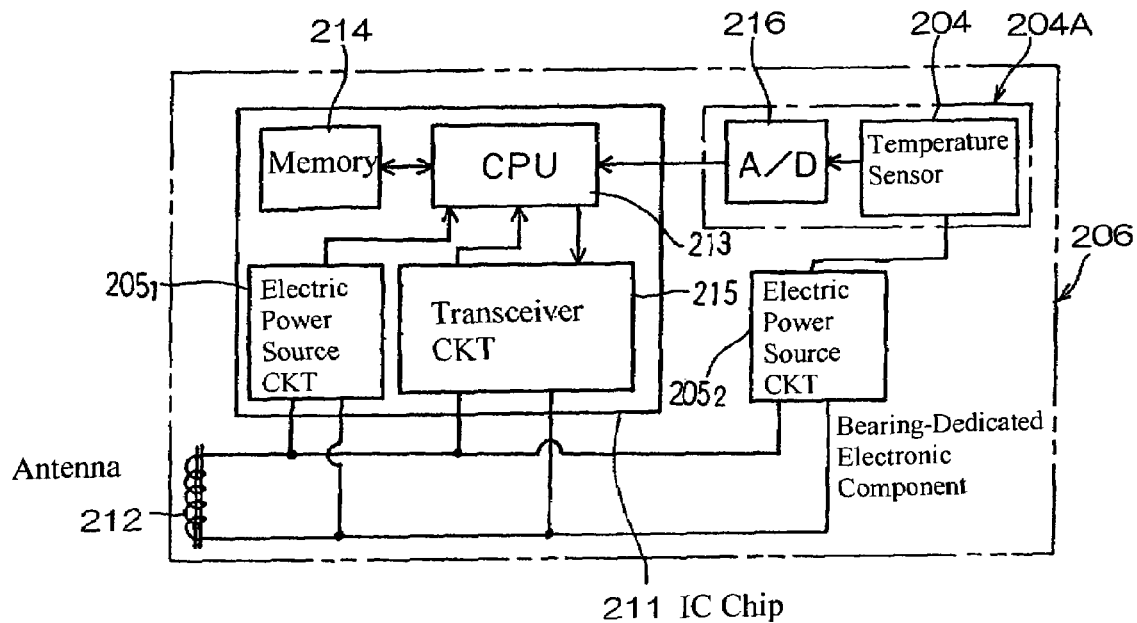
FIG. 18 is a circuit block diagram showing a modified form of the electronic device shown in FIG. 17.
Figure 20:
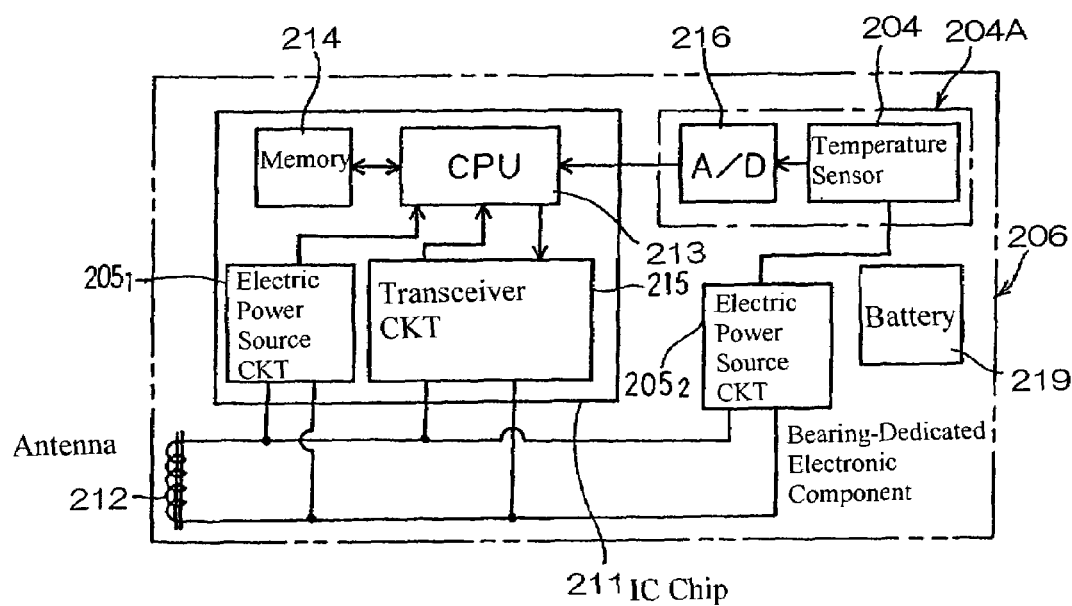
FIG. 20 is a circuit block diagram showing a still further modified form of the electronic device shown in FIG. 17.

It is to be noted that although in the sixth embodiment the electric power source circuit 205 built in the IC tag 203 is utilized to drive the temperature sensor 204, an electric power source circuit $205_2$ separate from an electric power source circuit $205_1$ for driving the IC tag 203 may be employed for driving the temperature sensor 204 as shown in FIG. 18. Even this electric power source circuit $205_2$ is electrically powered by an electric power supplied through the antenna 212. Also, the electric power source circuit $205_2$ may be provided with a rechargeable battery and a charging circuit 219 (not shown) as shown in FIG. 20.

Figure 19:
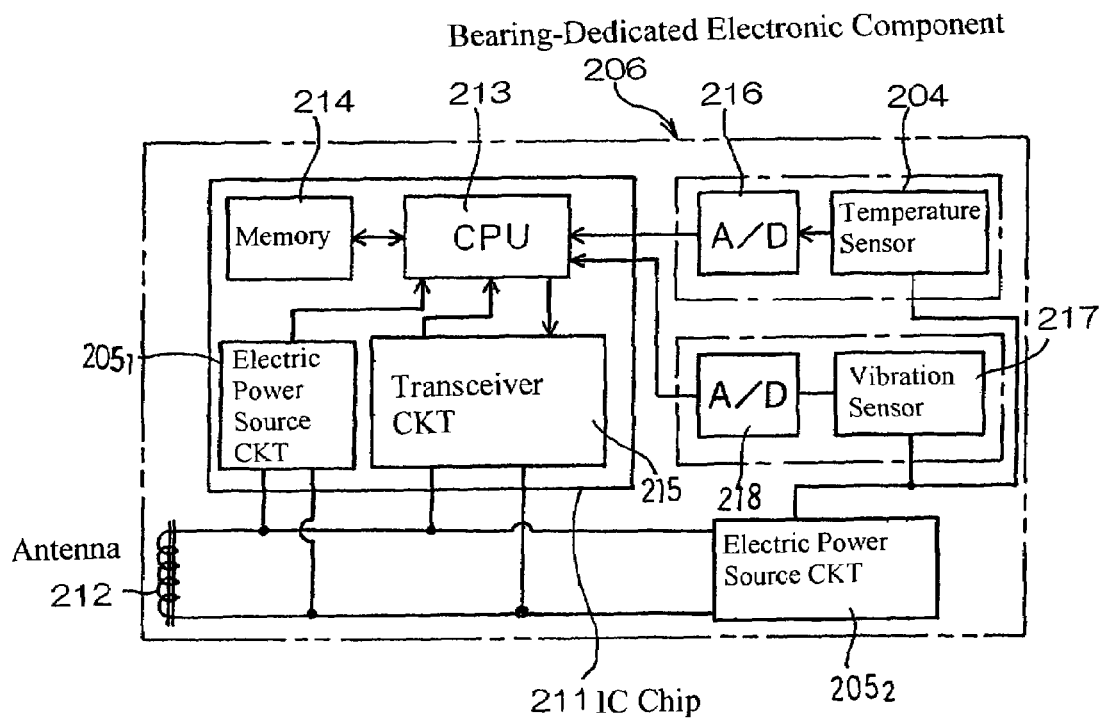
FIG. 19 is a circuit block diagram showing a further modified form of the electronic device shown in FIG. 17.

Also, the bearing dedicated electronic component 206 may have a vibration sensor 217 as shown in FIG. 19 together with the temperature sensor 204. An output from the vibration sensor 217 is connected to, for example, a predetermined input terminal (not shown) of the IC tag 203. Where the vibration sensor 217 outputs an analog signal, it is inputted to the IC tag 203 and others through an analog-to-digital (A/D) converter 218 operable to convert the analog signal into a digital signal. The A/D converter 218 is mounted on a common substrate (not shown) together with the vibration sensor 217. The vibration sensor 217 and the A/D converter 218 altogether constitute a converter equipped vibration sensor 217A. An output from the converter equipped vibration sensor 217A may be, although in the illustrated instance connected to the CPU 213 of the IC tag 203, connected to the transceiver circuit 215. Even in the case where the vibration sensor 217 is employed, the electric power source circuit $205_1$ built in the IC tag 203 can be employed as an electric power source for the vibration sensor 217, or a separate electric power source circuit $205_2$ may be employed for the vibration sensor 217 as shown in FIG. 19.

Figure 21:
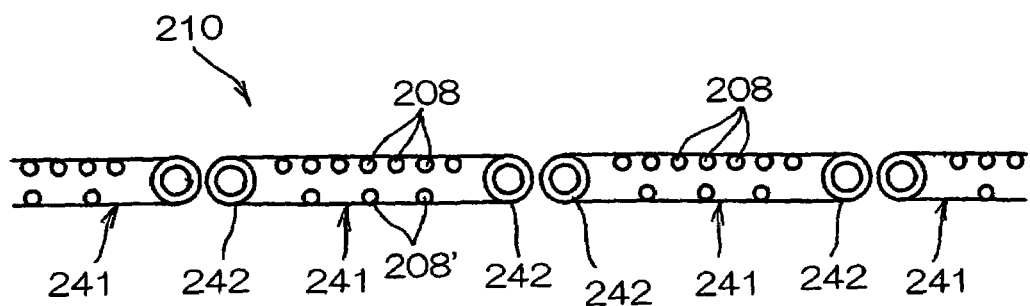
FIG. 21 is a side view of a conveyor line which forms a part of the machinery equipment to which the present invention is applicable.

FIGS. 21 to 25 illustrate the details of the machine facility 210. As shown in FIG. 21, this machine facility 210 is comprised of a conveyor line made up of a plurality of belt conveyors 241 lined up in a line. This machine facility 210 is specifically a conveyor line employed in a thermal power plant for transporting coals from a coal yard to a boiler (not shown).

Figure 22:
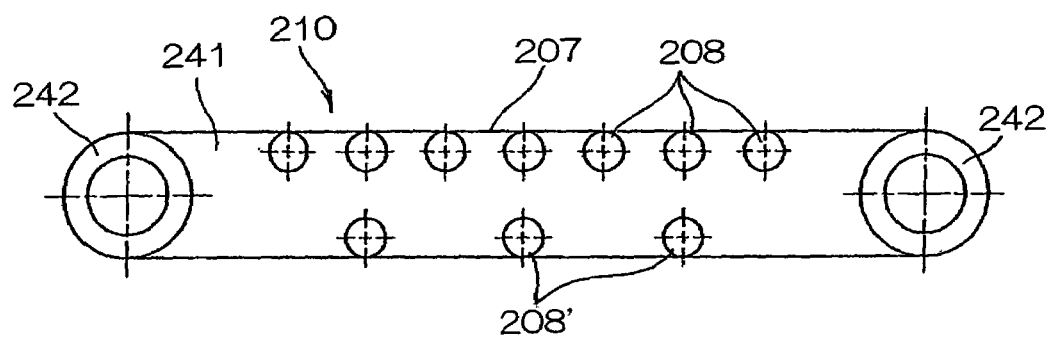
FIG. 22 is a side view of one of conveyors forming the conveyor line shown in FIG. 21.
Figure 23:
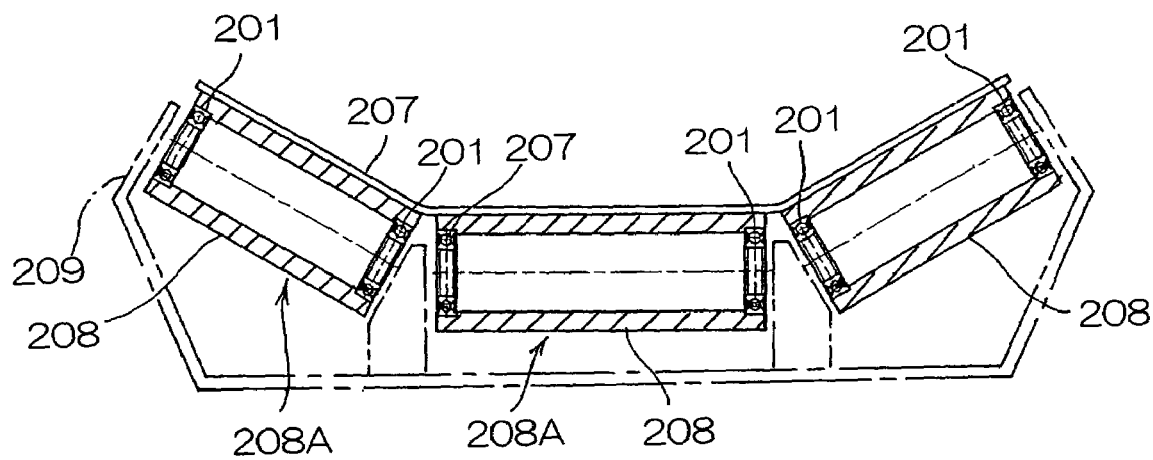
FIG. 23 is a transverse sectional view of the conveyor.
Figure 24:
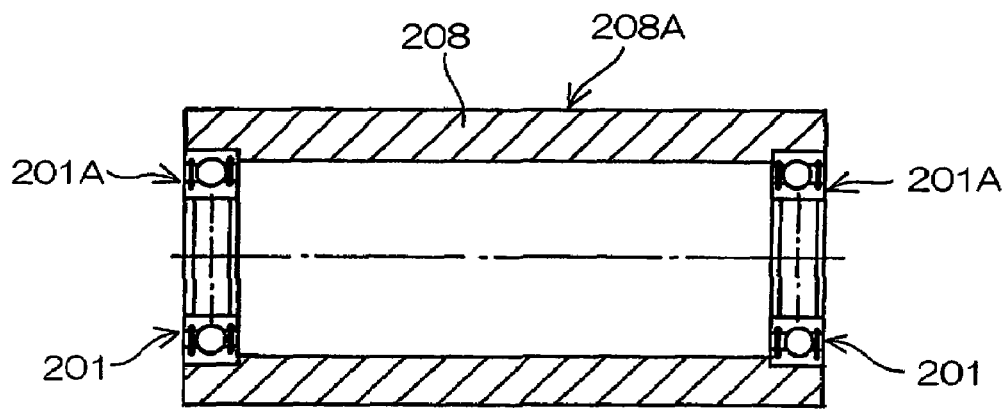
FIG. 24 is a longitudinal sectional view of a bearing unit which serves as one of rollers employed in the conveyor.
Figure 25:
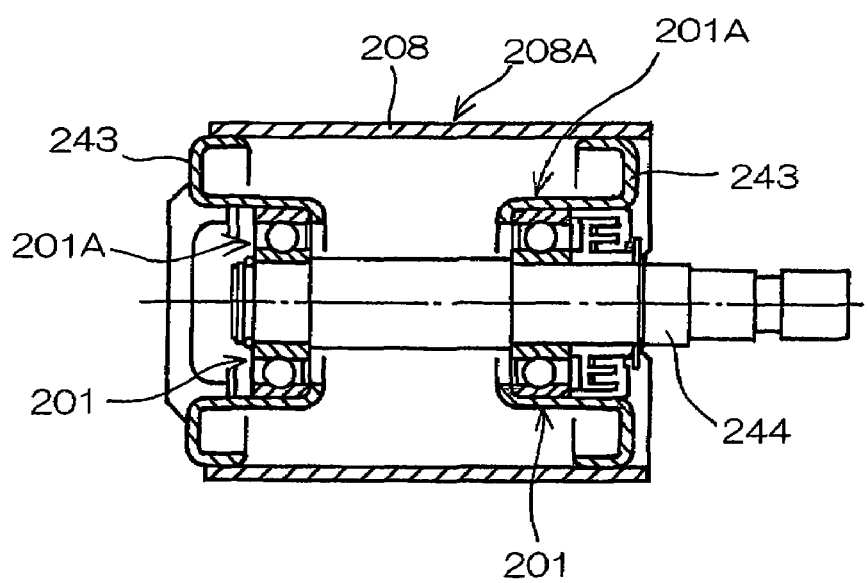
FIG. 25 is a longitudinal sectional view showing a modified form of the bearing unit which serves as one of rollers employed in the conveyor.

As shown FIG. 22, each of the belt conveyors 241 includes a pair of end rollers 252 and an endless belt 207 trained around the end rollers 242. An intermediate portion of the conveyor 141 is supported by a plurality of transport surface support rollers 208 and return support rollers 208'. The rollers 208 and 208' are arranged in a direction of transport. One or both of the end rollers 242 are a drive roller. The support rollers 208 includes, as shown in FIG. 23, a row of intermediate rollers 208 and two row of side rollers 208 inclined downwardly towards the intermediate rollers 208 on respective sides of the row of the intermediate rollers 208. The intermediate and side rollers 208 are arranged in a widthwise direction of the belt conveyor 241. Those rows of the rollers 208 support the belt 207 in a shape of a groove of a generally inverted trapezoidal shape. The intermediate and inclined side rollers 208 form respective bearing units 208A having the rolling bearings 201 incorporated in opposite ends of each roller 208. FIG. 24 illustrates a sectional configuration of each bearing unit 208 on an enlarged scale. Other than that shown in FIG. 24, the roller 208 may have its opposite ends each provided with a respective bearing housing 243 into which the corresponding rolling bearing 201 is incorporated as shown in FIG. 25. The inner race of the rolling bearing 210 is mounted on a roller support shaft 244, which is secured to a conveyor frame 209 (FIG. 23). The roller support shaft 244 may support the roller 208 at opposite ends thereof or in a cantilever fashion. FIG. 25 illustrates an example in which the side roller 208 is supported by the roller support shaft 244 in a cantilever fashion.

The rolling bearing 201 in each of the rollers 208 used in the machine facility 210 forming the conveyor line defines the IC tag and sensor equipped bearing assembly 201A having the IC tag and the temperature sensor 204 attached thereto as described hereinbefore.

Figure 26:
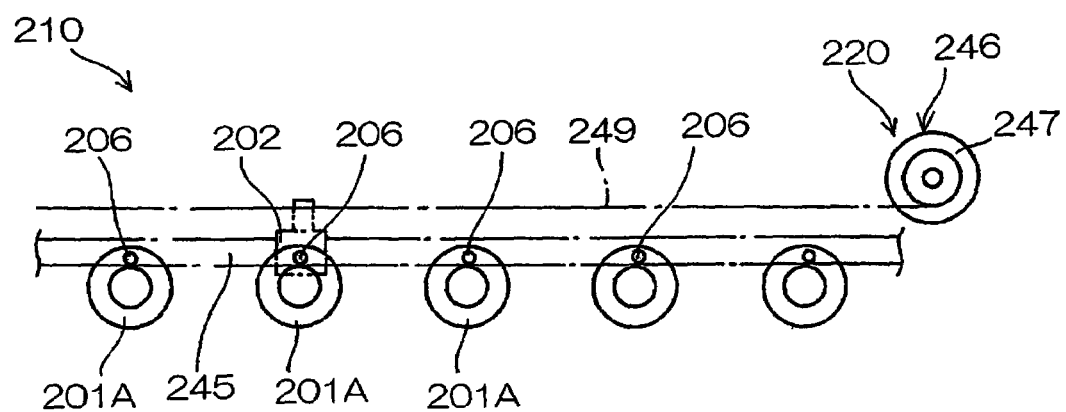
FIG. 26 is a side view showing an example of a terminal moving device for moving the tag read/write terminal.

FIG. 26 illustrates an example, in which the terminal moving device 220 for moving the tag read/write terminal 202 is employed in the machine facility 210 forming the conveyor line of the kind discussed above. The tag read/write terminal 202 is movably mounted on a guide rail 245 extending along the row of the rolling bearings 201 in the respective rollers 208 and can be traveled by a drive unit 246. The guide rail 245 may be, for example, either a rail secured to the conveyor frame 209 (FIG. 23) or a portion of the conveyor frame 208. The drive unit 246 includes a drive motor 247 and a winding drive transmission device 249 for transmitting the drive of the drive motor 247 to the tag read/write terminal 202 or may be a self-propelling device mounted on the tag read/write terminal 202.

The abnormality detecting method of the foregoing structure will now be described. The tag read/write terminal 202 is regularly or at any desired time moved to the IC tag and sensor equipped bearing assemblies 201A At this time, an electric power is supplied to the electric power source circuit 205 in the bearing assembly 201A so that the temperature sensor 204 can be driven for an arbitrary length of time to allow it to perform a temperature measurement. The temperature measurement is transmitted wireless to the tag read/write terminal 202 through the central processing unit 213 and the transceiver circuit 215 of the IC tag 203. In such case, only the maximum temperature measured by the temperature sensor 204 may be stored in the IC tag 203 and then transmitted to the tag read/write terminal 202. A result of the temperature measurement transmitted to the tag read/write terminal 202 may be transmitted to the control host equipment 228 (FIG. 17) at all times, or to the control host equipment 228 only when the measurements exceeds a certain predetermined temperature condition. Determination of whether the temperature measurement result exceeds the predetermined temperature condition is carried out by a condition determining unit (not shown) provided in the tag read/write terminal 202. Such a detecting procedure may be performed to a number of, for example, 100 IC tag and sensor equipped bearing assemblies 201A by the single tag read/write terminal 202. Since the single tag read/write terminal 202 can be used to monitor many IC tags and the sensor equipped bearing assemblies 201A and since only information indicative of the temperature measurement exceeding the predetermined temperature condition are transmitted to the control host equipment 228, only several tag read/write terminals 202 are sufficient to monitor some hundreds of IC tag and sensor equipped bearing assemblies 201A installed in the single machine facility 210. Should no immediate replacement be required even though there is a possibility that an abnormality may occur in the bearing 201 when the temperature measured exceeds the predetermined temperature condition, such bearing 201 should be monitored as continuously as possible and replaced at an appropriate timing at the time of, for example, halting of the operation.

In the abnormality detecting system, there is no need in the bearing unit 209A for the transmitting device and the electric power source necessary to drive the temperature sensor on a steady basis, which have hitherto been required in the case of the conventional full-time examination and only the provision of the IC tag 203 and the electric power source circuit 205 for supplying an electric power to the temperature sensor is required in the bearing unit 208A. Accordingly n6 receiver needs be installed in each of the bearing unit 208A. For this reason, the space for installation of the bearing unit 208A can advantageously be minimized and the equipment cost can also be minimized. By way of example, monitoring may be performed discontinuously once a day or every two hours and many bearings 201 can be monitored and, accordingly, the abnormality detecting system of the present invention can accommodate many bearings 201. Also, since making reference to the result of the temperature measurement, the replacement of the bearing 201 can be done prior to occurrence of an abnormality, the machine facility 210 itself will not meet a malfunctioning and will not be damaged. In addition, since the bearing likely to fail can be replaced during a regular servicing period in which the machine facility 210 is halted, inventory control of the bearings and bearing units for replacement use can easily be accomplished.

Also, since the IC tags 203 are used, identifying information necessary to identify each of the rolling bearings 201 having respective IC tags 203 attached thereto can be stored in the corresponding IC tag 203. The identifying information may include the manufacturing number, the lot number and the like. If the identifying information is available simultaneously with the information on the temperature measured, the specification of such bearing 201 can be available from the database or the like and, therefore, determination of the lifetime and control performed by the control host equipment 228 can further be facilitated. Moreover, information on the site of installation of each of the bearings 201 within the corresponding machine facility 210 may also be stored in the respective IC tag 203.

Figure 40:
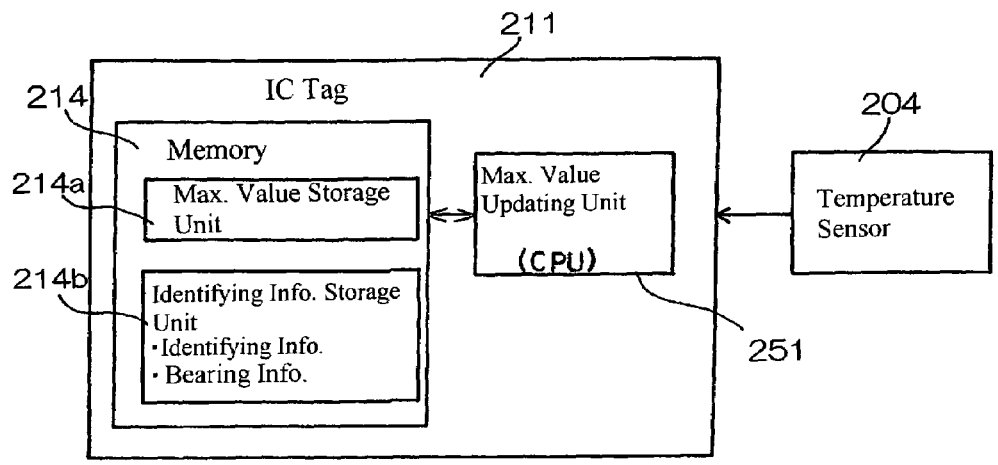
FIG. 40 is a circuit block diagram showing a modified form of the conceptual construction of the IC tag.

For storing the maximum value of the result of temperature measurement by the temperature sensor 204 in the IC tag 203, such IC tag 203 may be so constructed as hereinbelow described. Specifically, as shown in FIG. 40, the IC tag 203 includes a maximum value storage unit 214a and a maximum value update unit 251. The maximum value update unit 251 is operable to store in the maximum value storage unit 214a, a higher temperature measurement by comparing the temperature measurement detected by the temperature sensor 204, when the sensor 204 is supplied with an electric power from the tag read/write terminal 20, with the temperature measurement stored in the maximum value storage unit 214a. This IC tag 230 may be provided with an identifying information storage unit 214 so that the identifying information can be stored as well as other information such as bearing information.

The maximum value update unit 251 may be comprised of electronic circuit component parts and others provided on the bearing dedicated electronic component 206 separate from the IC tag 203. Also, instead of being provided in the IC tag and sensor equipped bearing assembly 201A, the maximum value update unit 251 may be provided in the tag read/write terminal 202. Even in such case, the IC tag 203 has to be provided with the maximum value storage unit 214a.

Figure 41:
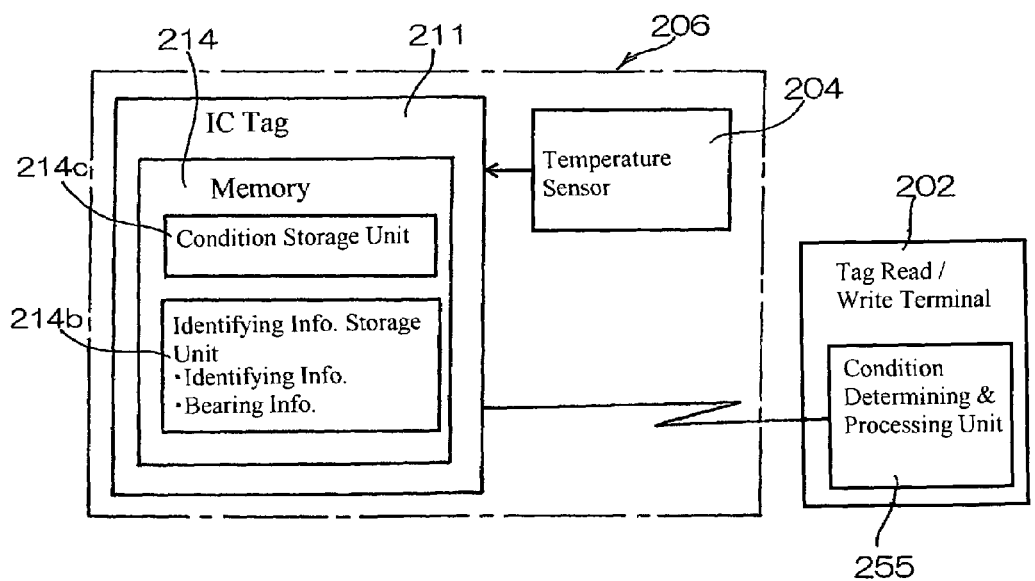
FIG. 41 is a circuit block diagram showing a modified form of the conceptual construction of the IC tag and the tag read/write terminal.

Also, where the transmission is made only when the temperature measurement exceeds the predetermined temperature condition, the following construction can be employed. Specifically, as shown in FIG. 41, the IC tag 203 is provided with a predetermined condition storage unit 214c for storing the predetermined temperature condition. On the other hand, the tag read/write terminal 202 is provided with a condition determining and processing unit 255 for performing a process in accordance with the predetermined temperature condition stored in the predetermined condition storage unit 214c. If the condition storage unit 214c is employed in the IC tag 203 to store the predetermined temperature condition, the condition determining and processing unit 255 can perform a proper process required by each of the IC tag and sensor equipped bearing assemblies 201A, even though the condition determining and processing means 255 will perform the same process subject to the different IC tag and sensor equipped bearing assemblies 201A.

While the foregoing description has been made as applicable to the case where only the temperature sensor 204 is employed, the following process can be performed where a vibration sensor 217 is employed such as shown in FIG. 19. The lifetime of the bearing 201 can be determined also in reference to vibrations. If vibration information is available in addition to the temperature information, a further precise determination of the presence or absence of an abnormality in the bearing can be accomplished. By way of example, if a cumulative rotational number storage and processing unit (not shown) for storing a cumulative number of revolutions detected from a detection signal outputted from the vibration sensor 217 is incorporated in either the tag read/write terminal 202 or the IC tag 203 employed in the bearing dedicated electronic component 206, or any other component, the lifetime determination based on the cumulative number of the revolutions can be achieved. The cumulative number of revolutions is stored in the IC tag 203.

Figure 27:
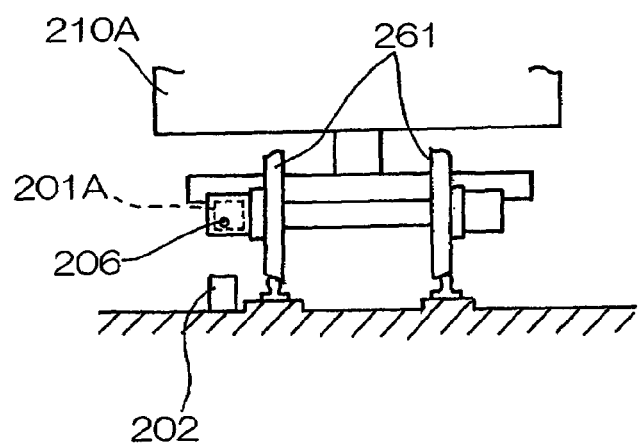
FIG. 27 is a fragmentary front elevational view of a railway vehicle to which the present invention is applicable.

FIG. 27 illustrates the example, in which the machine facility 210A utilizing the IC tag and sensor equipped bearing assemblies 201A having the respective tags attached thereto is represented by a railway vehicle. In the case of the machine facility 210A represented by a railway vehicle, a wheel support bearing 201 for rotatably supporting a wheel 261 has to be employed in the form of a IC tag and sensor equipped bearing assembly 201A. Also, a tag read/write terminal 202 has to be installed along one of rails so that when a railway vehicle travels along the rails, the tag read/write terminal 202 can perform reading of the IC tag 230 and also provide an electric power to the electric power source circuit 205.

Even in the case of the railway vehicle, many bearings 201 are employed. Since the temperature of each of those bearings 201 can be read out by the tag read/write terminal 202 installed along the rail, it is possible to achieve a temperature measurement while the railway vehicle travels along the rails. For this reason, it is possible to help out the routine inspection generally done while the railway vehicle is halted, facilitating an accurate determination of the presence or absence of an abnormality in each of the bearings 201 employed.

Hereinafter, some specific constructions in which the bearing dedicated electronic component 206 such as the IC tag 203 is incorporated in the rolling bearing 201 will be described with particular reference to FIGS. 28 to 39.

Figure 28:
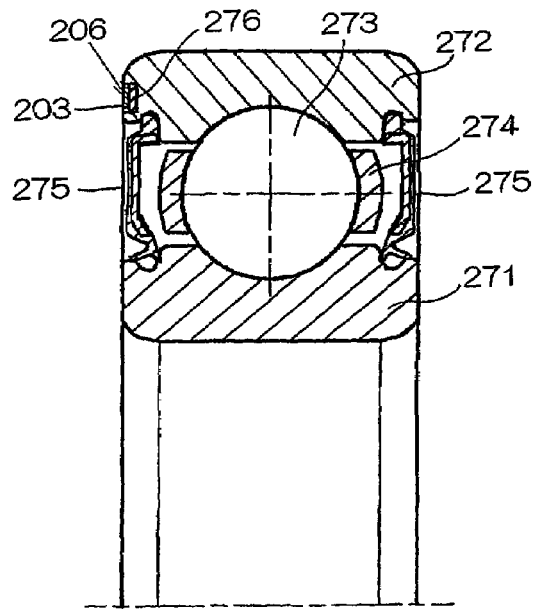
FIG. 28 is a fragmentary longitudinal sectional view showing an example of the IC tag and sensor equipped bearing assembly.

In particular, FIG. 28 illustrates an example, in which the bearing dedicated electronic component 206 is mounted on a bearing raceway member. The rolling bearing 201 includes inner and outer races 271 and 272, which are inner and outer raceway members, respectively, and a row of a plurality of rolling elements 273 rollingly interposed between respective raceways defined in the inner and outer races 271 and 272 in alignment with each other and retained by a retainer 273. The rolling elements 273 are each employed in the form of a ball. Sealing members 275 are arranged at opposite annular open ends of an annular bearing space delimited between the inner and outer races 271 and 272. Each of the sealing members 275 is in the form of a contact seal secured to the outer race 272 and having a free end thereof held in sliding contact with the inner race 271. The outer race 272 has one of its opposite annular end faces formed with a tag mounting pocket 276, and the bearing dedicated electronic component 206 including the IC tag 203 and the temperature sensor 204 is embedded within the tag mounting pocket 276. The bearing dedicated electronic component 206 has a substrate on which the IC tag 203 and the temperature sensor 204 are surface mounted and, after having been embedded within the tag mounting pocket 276, the electronic component 206 is sealed with a resinous molding.

In the case where the bearing dedicated electronic component 206 is fixed to the outer race 272 in the manner described above, it is possible to firmly fix the bearing dedicated electronic component 206.

Figure 29A:
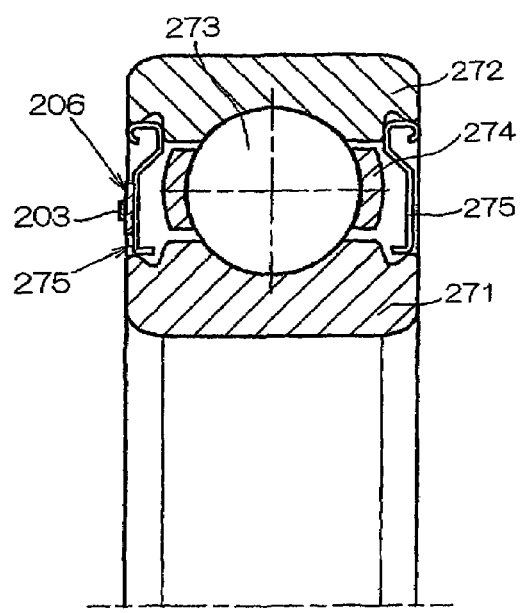
FIG. 29A is a fragmentary longitudinal sectional view, showing another example of the IC tag and sensor equipped bearing assembly.
Figure 29B:
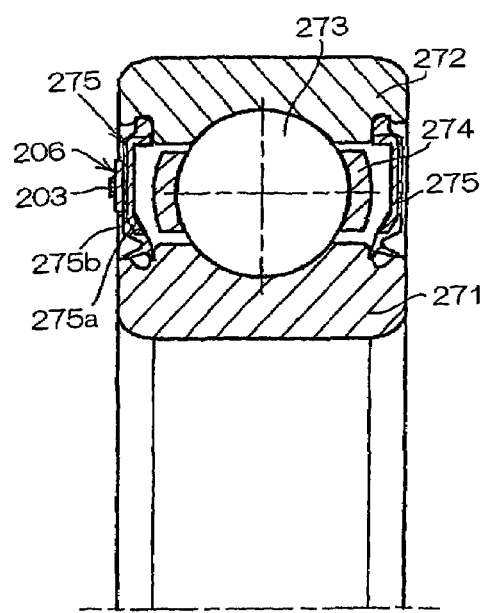
FIG. 29B is a fragmentary longitudinal sectional view, showing a further example of the IC tag and sensor equipped bearing assembly.

FIGS. 29A and 29B illustrates the examples in which the bearing dedicated electronic component 206 is attached to the sealing member 275 of the rolling bearing 201. In particular, FIG. 29A illustrates the example, in which the sealing member 275 is a non-contact bearing and, in this case, the bearing dedicated electronic component 206 is bonded to the sealing member 275 by the use of a bonding agent. FIG. 29B illustrates the example, in which the sealing member 275 is a non-contact bearing, but the bearing dedicated electronic component 206 is secured by vulcanization to a core metal 275b of the sealing member 275 during vulcanization of a rubber material 275a, which eventually forms the sealing member 275.

The raceway members such as the inner and outer races 271 and 272 require not only complicated manufacturing stages, but also severe requirements to be satisfied in terms of strength and, therefore, increase of the manufacturing stages may often be undesirable where the IC tag 203 and the temperature sensor 204 are to be incorporated. However, if the bearing dedicated electronic component 205 is attached to the sealing member 275, which is a handy part as hereinabove described, mounting of the bearing dedicated electronic component 206 can be facilitated advantageously. Also, where the bearing dedicated electronic component 206 is to be attached to the sealing member 275, the standard manufacturing stages generally employed to manufacture bearing assemblies, in which no IC tag 203 is employed, can be employed with an excellent productivity so long as major bearing components such as the inner and outer races 271 and 273, the sealing member 275 and others are concerned.

Figure 30:
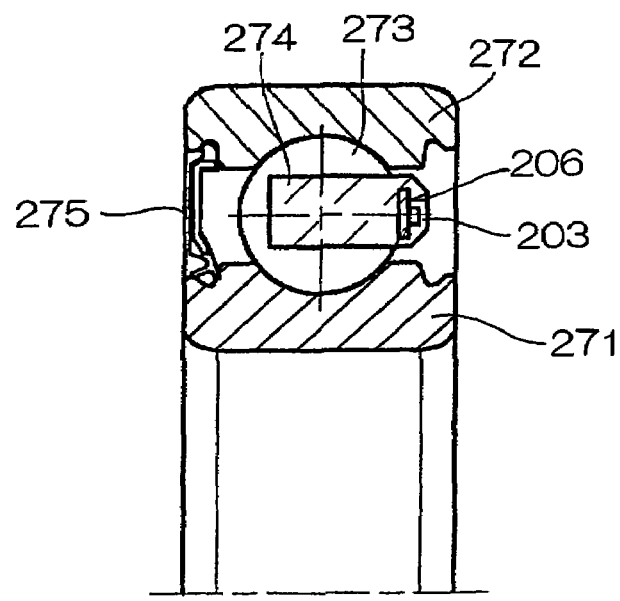
FIG. 30 is a fragmentary longitudinal sectional view, showing a further example of the IC tag and sensor equipped bearing assembly.
Figure 31:
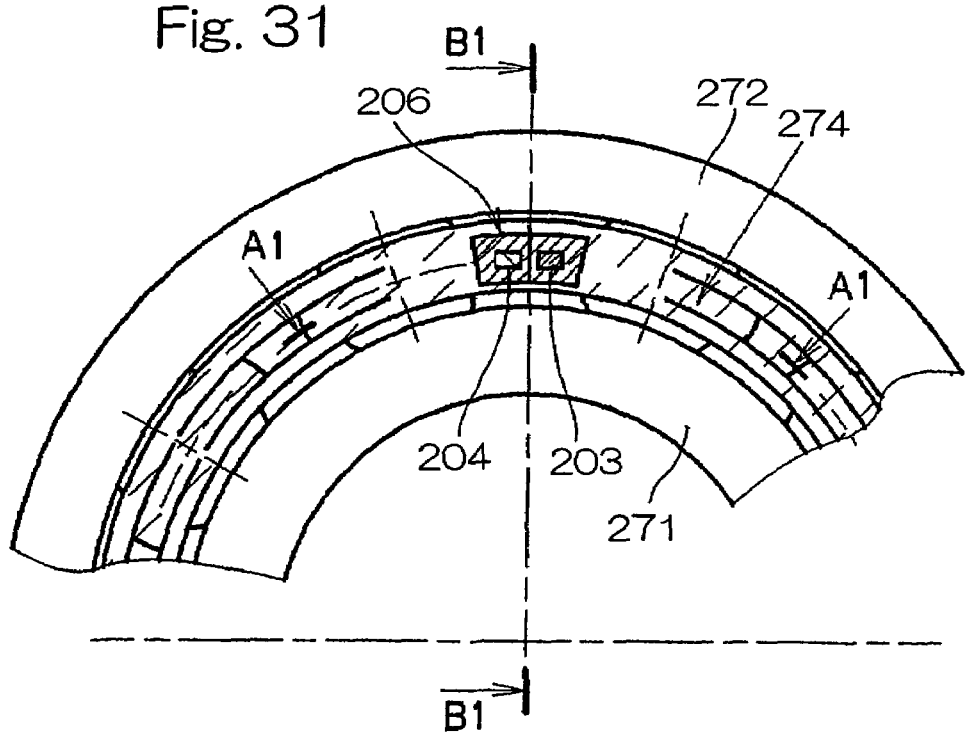
FIG. 31 is a front view of the IC tag and sensor equipped bearing assembly of FIG. 30.
Figure 32:
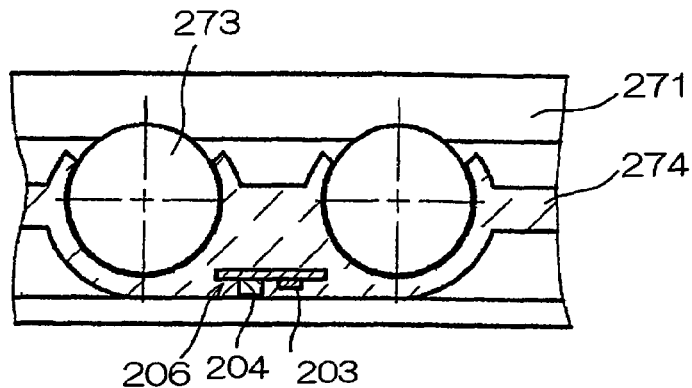
FIG. 32 is a cross-sectional view taken along the line A1-A1 in FIG. 31.

FIGS. 30, 31 and 32 illustrate an example, in which the bearing dedicated electronic component 206 is attached to the retainer 274 of the rolling bearing 201. FIG. 30 illustrates a cross-section of a portion of the rolling bearing 201, taken along the line B1-B1 in FIG. 31. FIG. 32 illustrates a cross-sectional view of the bearing 201 taken along the line A1-A1 in FIG. 31. The retainer 274 shown therein is either comb-shaped or in the form of a cage and is made of a synthetic resin. One of the sealing members 275 adjacent the location where the bearing dedicated electronic component part 206 is installed is omitted to eliminate any obstruction to the transmission or receipt of a signal and only the other of the sealing members 275 is employed. The bearing dedicated electronic component 206 has a substrate, on which the IC tag 203 and the temperature sensor 204 are surface mounted, and is integrally embedded within a block of synthetic resin forming the retainer 274.

Figure 33:
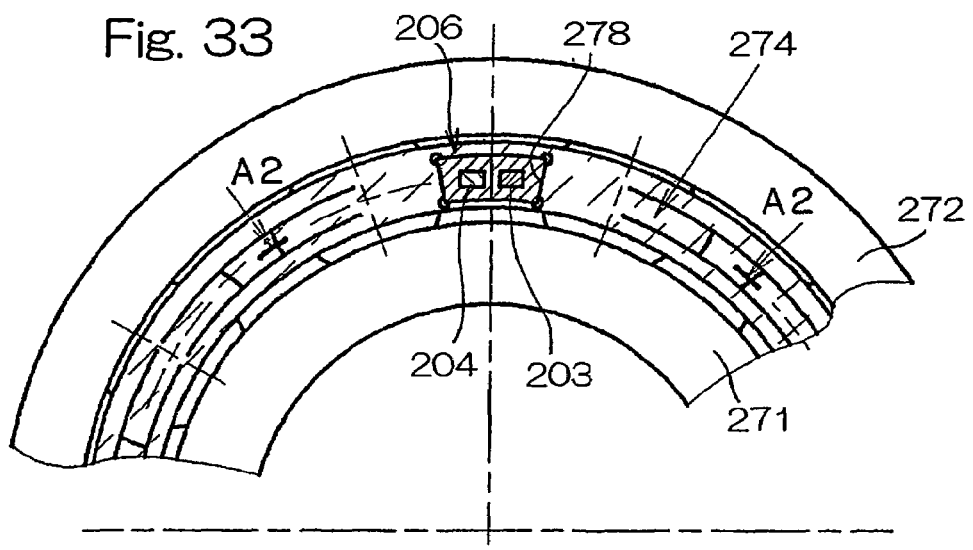
FIG. 33 is a front view of a different version of the IC tag and sensor equipped bearing assembly.
Figure 34:
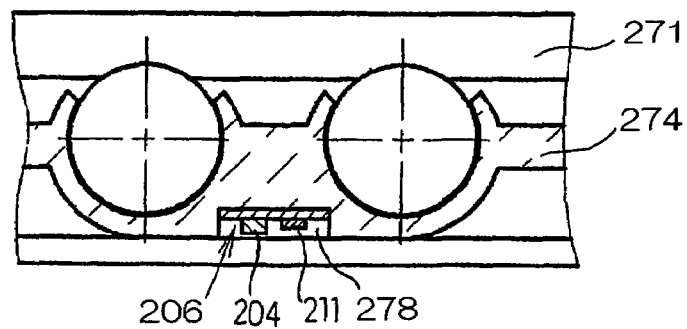
FIG. 34 is a cross-sectional view taken along the line A2-A2 in FIG. 33.

Other than the integral molding, an IC tag mounting pocket 278 may be defined in the retainer 274, into which the bearing dedicated electronic component 206 is inserted, followed by sealing of the mounting pocket 278 with a synthetic resin, as shown in FIGS. 33 and 34. In this case, the retainer 274, which has been described as made of a synthetic resin, may be made of a metallic material.

Thus, even where the bearing dedicated electronic component 206 is attached to the retainer 274, the bearing dedicated electronic component 206 can easily be fixed with a simple step as compared with that secured to the raceway member.

Figure 35:
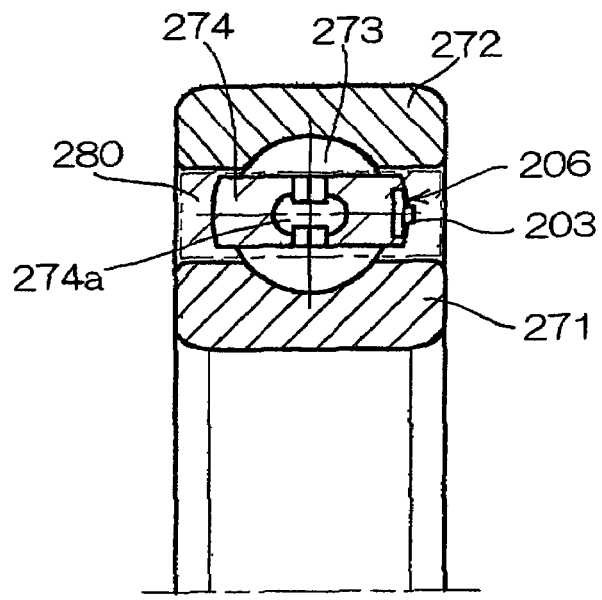
FIG. 35 is a fragmentary longitudinal sectional view of a further different version of the IC tag and sensor equipped bearing assembly.
Figure 36:
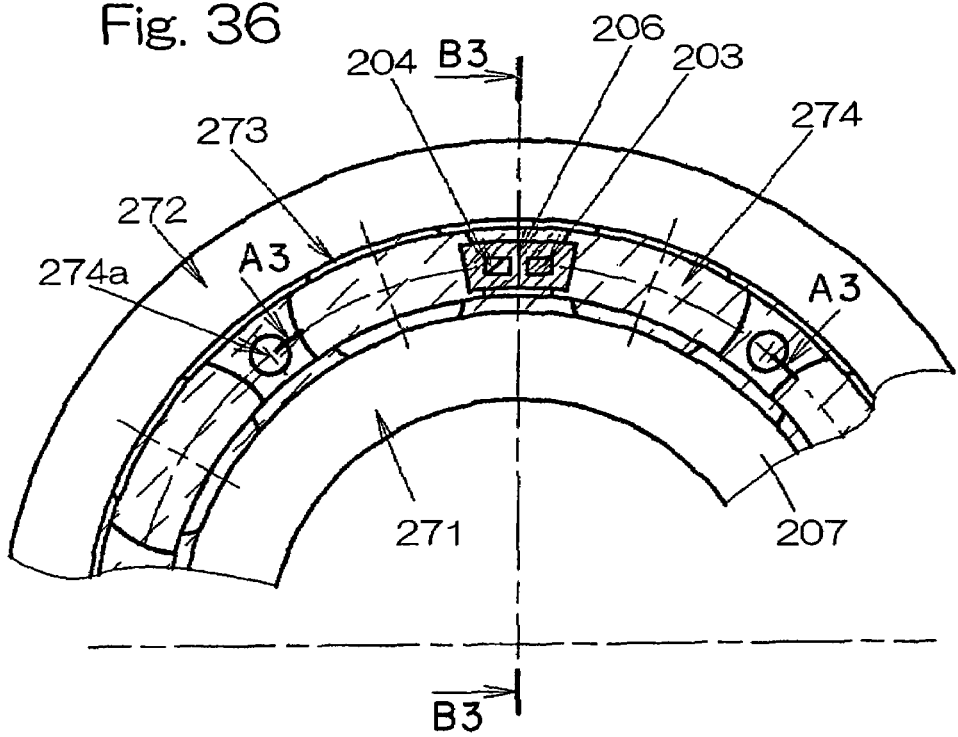
FIG. 36 is a fragmentary front view of the IC tag and sensor equipped bearing assembly of FIG. 35.
Figure 37:
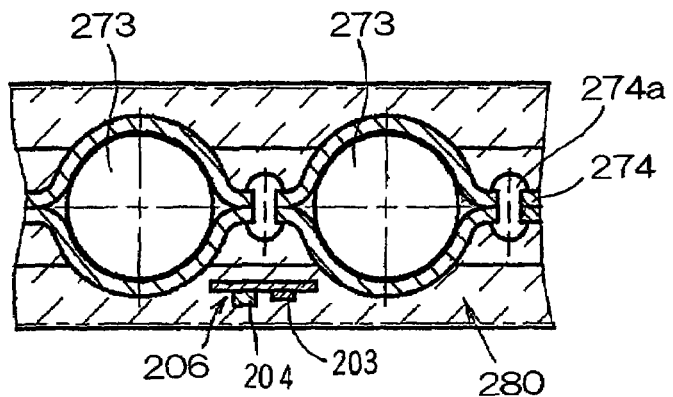
FIG. 37 is a cross-sectional view taken along the line A3-A3 in FIG. 36.
Figure 38:
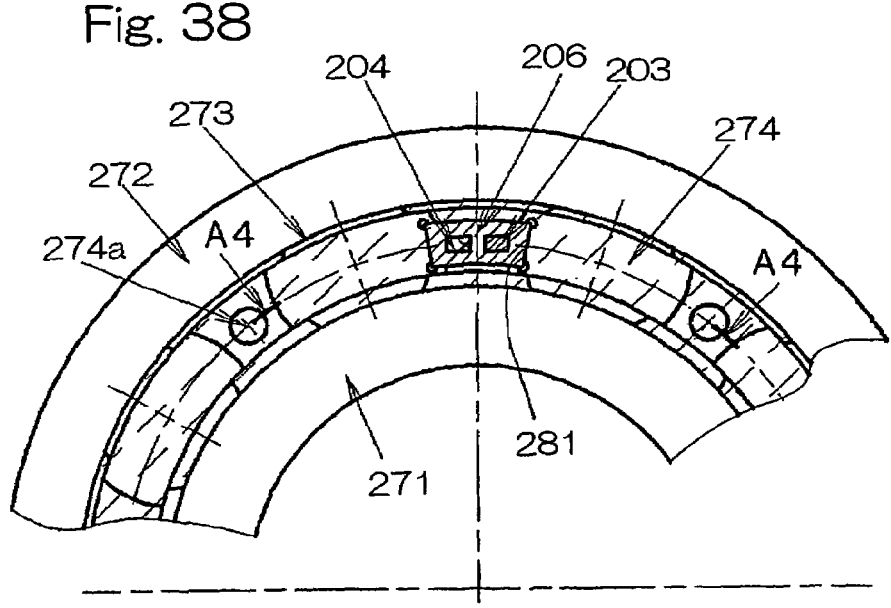
FIG. 38 is a front view of a still further different version of the IC tag and sensor equipped bearing assembly.
Figure 39:
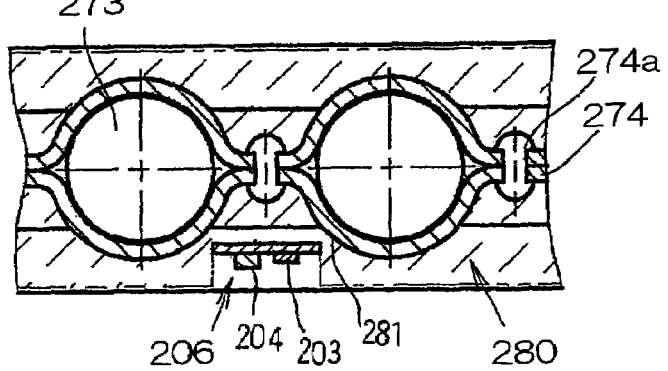
FIG. 39 is a cross-sectional view taken along the line A4-A4 in FIG. 38.

FIGS. 35 to 37 illustrates an example, in which the bearing dedicated electronic component 206 is embedded in a solid lubricant 280 provided inside the rolling bearing 201. In particular, FIG. 35 illustrates a cross-section taken along the line B3-B3 in FIG. 36 and FIG. 37 illustrates a cross-section taken along the line A3-A3 in FIG. 36. The solid lubricant 280 is of a composition containing a synthetic resin impregnated with grease. This solid lubricant 280 is provided in a ring shape within the annular bearing spaced delimited between the inner and outer races 271 and 272. The bearing dedicated electronic component 206 has a substrate, on which the IC tag 203 and the temperature sensor 204 are surface mounted, and is, for example, integrally embedded in the solid lubricant 280. Other than the integration with the solid lubricant 280, this bearing dedicated electronic component 206 may be inserted into an IC tag mounting pocket 281, defined in a portion of the solid lubricant 280 as shown in FIGS. 38 and 39, which pocket 281 is subsequently sealed with a synthetic resin with the bearing dedicated electronic component 206 embedded therein.

Where the bearing dedicated electronic component 206 is embedded in the solid lubricant 280, component parts of each bearing may be similar to those generally employed in the standard bearing. Accordingly, dedicated bearing components for the bearing 201 are not required and with a simplified mounting process of the bearing dedicated electronic component 206 can be achieved.

What is claimed is:

1. A quality control method for controlling a machine component having a plurality of elements including a rolling element by utilizing a non-contact recordable/readable IC tag having recorded therein manufacturing information on each stage of a manufacturing process ranging from purchase of material for the machine component to an examination stage by way of forging, heat treatment and grinding stages, to enable the traceability for quality control purpose, the method comprising:

a step of attaching the IC tag to any one of the plural elements of the machine component at the time of manufacture of the machine component or at the time of completion of the manufacture thereof;

a step of recording on the IC tag attached to the machine component, at least one of material information and processing condition information related to at least one of the forging, heat treatment and grinding stages, by the time of shipment or by a time of delivery to a customer; and a step for reading the information recorded on the IC tag at any desired time subsequent to the shipment and making a confirmation of at least one of the processing condition information and the material information with reference to the information read out from the IC tag.

2. A quality control method for controlling a machine component having a plurality of elements including a rolling element by utilizing a non-contact recordable/readable IC tag and a database for storing predetermined manufacturing information on each stage of a manufacturing process ranging from purchase of material for the machine component to an examination stage by way of forging, heat treatment and grinding stages together with identifying information associated with the machine component and for allowing storage contents in the database to be extractable with reference to the identifying information, to enable the traceability for quality control purpose, the method comprising:

a step of attaching the IC tag to any one of the plural elements of the machine component at the time of manufacture of the machine component or at the time of completion of the manufacture thereof;

a step of recording on the IC tag attached to the machine component in accordance with the database, the identifying information related to the machine component and at least one of material information and processing condition information related to at least one of the forging, heat treatment and grinding stages, by the time of shipment or by the time of delivery to a customer; and a step of reading, at any time subsequent to shipment, the information recorded on the IC tag and making a confirmation of at least one of the processing condition information and the material information or a confirmation of results of examination with reference to the information read out from the IC tag or with reference to information obtained by checking the information read out from the IC tag with the database.

3. A quality control method for controlling a machine component having a plurality of elements including a rolling element by utilizing a non-contact recordable/readable IC tag and a database for storing predetermined manufacturing information on each stage of a manufacturing process ranging from purchase of material for the machine component to an examination stage by way of forging, heat treatment and grinding stages together with identifying information associated with the machine component and for allowing storage contents in the database to be extractable with reference to the identifying information, to enable the traceability for quality control purpose, the method comprising:

a step of attaching the IC tag to any one of the plural elements of the machine component at the time of manufacture of the machine component or at the time of completion of the manufacture thereof;

a step of recording on the IC tag attached to the machine component in accordance with the database, the identifying information related to the machine component and information on at least one of the date of manufacture, the place of manufacture, the brand of a filled grease, the element-to-element gap size, the term of warranty and the handling caution;

a step of reading, at any time subsequent to the shipment, the information recorded on the IC tag and making a confirmation of the material purchased, a confirmation of the manufacturing process, a confirmation of one of processing condition and the material information or a confirmation of results of examination with reference to the information read out from the IC tag or with reference to information obtained by checking the information read out from the IC tag with the database.

4. The quality control method as claimed in claim 1, further comprising:

a step of recording the manufacturing information on a manufacturing process of each of the elements of the machine component including the purchase of material, forging stage, heat treatment stage and grinding stage, on an IC tag prepared for each lot number of the elements at each of the manufacturing stages; and a step of reading the information recorded from the IC tag attached to the element and recording portion or the whole of the information, which has been read from the IC tag, on the IC tag attached to the machine component, wherein the manufacturing information recorded on the IC tag for the manufacturing process includes processing condition information descriptive of processing conditions during at least one of the forging, heat treatment and grinding stages and/or material information descriptive of material used to form the elements.

5. The quality control method as claimed in claim 2, further comprising:

a step of recording the manufacturing information on a manufacturing process of each of the elements of the machine component including the purchase of material, forging stage, heat treatment stage and grinding stage, on an IC tag prepared for each lot number of the elements at each of the manufacturing stages; and a step of reading the information recorded from the IC tag attached to the element and recording portion or the whole of the information, which has been read from the IC tag, on the IC tag attached to the machine component, wherein the manufacturing information recorded on the IC tag for the manufacturing process includes processing condition information descriptive of processing conditions during at least one of the forging, heat treatment and grinding stages and/or material information descriptive of material used to form the elements.

6. The quality control method as claimed in claim 3, further comprising:

a step of recording the manufacturing information on a manufacturing process of each of the elements of the machine component including the purchase of material, forging stage, heat treatment stage and grinding stage, on an IC tag prepared for each lot number of the elements at each of the manufacturing stages; and a step of reading the information recorded from the IC tag attached to the element and recording portion or the whole of the information, which has been read from the IC tag, on the IC tag attached to the machine component, wherein the manufacturing information recorded on the IC tag for the manufacturing process includes processing condition information descriptive of processing conditions during at least one of the forging, heat treatment and grinding stages and/or material information descriptive of material used to form the elements.

7. The quality control method as claimed in claim 1, further comprising:

a step of recording on a time-of-manufacture control database the manufacturing information on a manufacturing process of the elements of the machine component including the purchase of material, forging stage, heat treatment stage, grinding stage and examination stage, in association with an identifying number assigned to each lot number of the elements or each of the elements; and a step of recording the manufacturing information, which has been recorded in the time-of-manufacture database, on the IC tag attached to the machine component.

8. The quality control method as claimed in claim 2, further comprising:

a step of recording on a time-of-manufacture control database the manufacturing information on a manufacturing process of the elements of the machine component including the purchase of material, forging stage, heat treatment stage, grinding stage and examination stage, in association with an identifying number assigned to each lot number of the elements or each of the elements; and a step of recording the manufacturing information, which has been recorded in the time-of-manufacture database, on the IC tag attached to the machine component.

9. The quality control method as claimed in claim 3, further comprising:

a step of recording on a time-of-manufacture control database the manufacturing information on a manufacturing process of the elements of the machine component including the purchase of material, forging stage, heat treatment stage, grinding stage and examination stage, in association with an identifying number assigned to each lot number of the elements or each of the elements; and a step of recording the manufacturing information, which has been recorded in the time-of-manufacture database, on the IC tag attached to the machine component.

10. A quality control method for controlling machine components to be examined individually each of which is formed by assembling a plurality of kinds of elements that are manufactured through a process of purchase of material, a forging stage, a heat treatment stage and a grinding stage, the method comprising, with respect to each of those elements:

at the time of purchase of material for each of the elements, a step of recording on an IC tag prepared for each of material lots, a material lot number for the corresponding material lot and information concerning the material purchased;

at the forging stage, a step of preparing the IC tag for the corresponding material lot or an IC tag having the same information recorded on the IC tag for the corresponding material lot and recording a forging lot number of a respective forging lot and information obtained during the forging stage on those IC tags;

at the heat treatment stage, a step of preparing the IC tag for the corresponding forging lot or an IC tag having the same information recorded on the IC tag for the corresponding forging lot and recording a heat treatment lot number of a respective heat treatment lot and information obtained during the heat treatment stage on those IC tags; and at the time of examination subsequent to the grinding stage, a step of preparing the IC tag for the corresponding heat treatment lot or an IC having the same information recorded on the IC tag for the corresponding heat treatment lot, for each of the elements or for each of sets of the elements of the same kind, each of which sets providing a basis for a unit for examination, and recording a respective grinding lot number and information obtained at the stage of examination on those IC tags;

wherein an IC tag is attached to each of the machine components, assembled with the elements, during the assemblage;

wherein of a manufacturing number unique to each of the machine components and the information recorded on the IC tag subsequent to the stage of examination of each of the elements, at least the manufacturing number is recorded on the IC tag attached to the respective machine component; and wherein the information recorded on the IC tag subsequent to the stage of examination of each of the elements and information on examination of the respective machine component subsequent to completion thereof are recorded in a database in association with the manufacturing number.

11. A quality control method for controlling machine components that are examined on a lot basis by the lot-by-lot sampling inspection procedure and that are formed by assembling a plurality of kinds of elements that are manufactured through a process of purchase of material, a forging stage, a heat treatment stage and a grinding stage, the method comprising, with respect to each of those elements:

at the time of purchase of material for each of the elements, a step of recording on an IC tag prepared for each of material lots, a material lot number for the corresponding material lot and information concerning the material purchased;

at the forging stage, a step of preparing the IC tag for the corresponding material lot or an IC tag having the same information recorded on the IC tag for the corresponding material lot and recording a forging lot number of a respective forging lot and information obtained during the forging stage on those IC tags;

at the heat treatment stage, a step of preparing the IC tag for the corresponding forging lot or an IC tag having the same information recorded on the IC tag for the corresponding forging lot and recording a heat treatment lot number of a respective heat treatment lot and information obtained during the heat treatment stage on those IC tags; and at the time of examination subsequent to the grinding stage, a step of preparing the IC tag for the corresponding heat treatment lot or an IC having the same information recorded on the IC tag for the corresponding heat treatment lot and recording a grinding lot number for the corresponding grinding lot and information obtained at the examination stage on those IC tags;

wherein an IC tag is attached to each of the machine components, assembled with the elements, during the assemblage;

wherein of a manufacturing lot number unique to the machine component and the information recorded on the IC tag subsequent to the stage of examination of each of the elements, at least the manufacturing lot number is recorded on the IC tag attached to the respective machine component; and wherein the information recorded on the IC tag subsequent to the stage of examination of each of the elements and information on examination of the respective machine component subsequent to completion thereof are recorded in a database in association with the manufacturing lot number.

12. The quality control method as claimed in claim 10, wherein the IC tag provided for each material lot, the IC tag provided for each forging lot and the IC tag provided for each heat treatment lot are attached to a container accommodating a plurality of materials of the same material lot, a container accommodating a plurality of elements of the same forging lot and a container accommodating a plurality of elements of the same heat treatment lot, respectively.

13. The quality control method as claimed in claim 11, wherein the IC tag provided for each material lot, the IC tag provided for each forging lot and the IC tag provided for each heat treatment lot are attached to a container accommodating a plurality of materials of the same material lot, a container accommodating a plurality of elements of the same forging lot and a container accommodating a plurality of elements of the same heat treatment lot, respectively.

14. The quality control method as claimed in claim 10, wherein the machine component includes elements different from the elements manufactured through a process of purchase of material, the forging stage, the heat treatment stage and the grinding stage and information concerning those different elements is recorded in the database after assemblage of the machine component in association with the manufacturing number or the lot number.

15. The quality control method as claimed in claim 11, wherein the machine component includes elements different from the elements manufactured through a process of purchase of material, the forging stage, the heat treatment stage and the grinding stage and information concerning those different elements is recorded in the database after assemblage of the machine component in association with the manufacturing number or the lot number.

16. The quality control method as claimed in claim 1, wherein the machine component is a rolling bearing and the elements manufactured through a process of purchase of material, the forging stage, the heat treatment stage and the grinding stage includes an inner race, an outer race and rolling elements.

17. The quality control method as claimed in claim 2, wherein the machine component is a rolling bearing and the elements manufactured through a process of purchase of material, the forging stage, the heat treatment stage and the grinding stage includes an inner race, an outer race and rolling elements.

18. The quality control method as claimed in claim 3, wherein the machine component is a rolling bearing and the elements manufactured through a process of purchase of material, the forging stage, the heat treatment stage and the grinding stage comprises an inner race, an outer race and rolling elements.

19. The quality control method as claimed in claim 10, wherein the machine component is a rolling bearing and the elements manufactured through a process of purchase of material, the forging stage, the heat treatment stage and the grinding stage includes an inner race, an outer race and rolling elements.

20. The quality control method as claimed in claim 11, wherein the machine component is a rolling bearing and the elements manufactured through a process of purchase of material, the forging stage, the heat treatment stage and the grinding stage includes an inner race, an outer race and rolling elements.

21. The quality control method as claimed in claim 1, wherein the machine component is filled with a grease during assemblage thereof and the IC tag attached to such machine component is recorded with the date of assemblage of such machine component.

22. The quality control method as claimed in claim 2, wherein the machine component is filled with a grease during assemblage thereof and the IC tag attached to such machine component is recorded with the date of assemblage of such machine component.

23. The quality control method as claimed in claim 3, wherein the machine component is filled with a grease during assemblage thereof and the IC tag attached to such machine component is recorded with the date of assemblage of such machine component.

24. The quality control method as claimed in claim 10, wherein the machine component is filled with a grease during assemblage thereof and the IC tag attached to such machine component is recorded with the date of assemblage of such machine component.

25. The quality control method as claimed in claim 11, wherein the machine component is filled with a grease during assemblage thereof and the IC tag attached to such machine component is recorded with the date of assemblage of such machine component.

26. The quality control method as claimed in claim 1, wherein the IC tag attached to the machine component is recorded with information on whereabouts of the machine component from shipment of the machine component to delivery thereof to a customer.

27. The quality control method as claimed in claim 2, wherein the IC tag attached to the machine component is recorded with information on whereabouts of the machine component from shipment of the machine component to delivery thereof to a customer.

28. The quality control method as claimed in claim 3, wherein the IC tag attached to the machine component is recorded with information on whereabouts of the machine component from shipment of the machine component to delivery thereof to a customer.

29. The quality control method as claimed in claim 10, wherein the IC tag attached to the machine component is recorded with information on whereabouts thereof from shipment of the machine component to delivery thereof to a customer.

30. The quality control method as claimed in claim 11, wherein the IC tag attached to the machine component is recorded with information on whereabouts of the machine component from shipment of the machine component to delivery thereof to a customer.

31. An abnormality detecting system for detecting the presence or absence of an abnormality in an IC tag and sensor equipped bearing assembly, wherein the IC tag and sensor equipped bearing assembly constitutes a rolling bearing incorporated in a machine facility and includes an IC tag, a temperature sensor and an electric power source circuit, which circuit is incorporated in the IC tag or which is separate from the IC tag and is supplied with an electric power from an outside of the bearing on a non-contact basis for driving the temperature sensor, the system comprising a tag read/write terminal for reading and/or writing information from or on the IC tag and supplying the electric power to the electric power source circuit on the non-contact basis.

32. The abnormality detecting system as claimed in claim 31, wherein the IC tag and sensor equipped bearing assembly additionally includes a vibration sensor and wherein the electric power source circuit is capable of driving the vibration sensor.

33. The abnormality detecting system as claimed in claim 31, wherein the IC tag is recorded with identifying information required to identify the rolling bearing assembly having the IC tag attached thereto.

34. The abnormality detecting system as claimed in claim 31, wherein the machine facility includes a plurality of the IC tag and sensor equipped bearing assemblies arranged in a row.

35. The abnormality detecting system as claimed in claim 34, further comprising a terminal moving device for moving the tag read/write terminal along the row of the IC tag and sensor equipped bearing assemblies so that an electric power can be supplied to the electric power circuit and the tag read/write terminal can read and/or write information from or on the IC tag.

36. The abnormality detecting system as claimed in claim 34, wherein the machine facility comprises a conveyor line including a belt conveyor or a roller conveyor and wherein the IC tag and sensor equipped bearing assembly comprises a bearing for supporting a belt roller or a conveyor roller.

37. The abnormality detecting system as claimed in claim 36, wherein the machine facility comprises a belt conveyor for transporting coals, for use in a thermal power plant, towards a boiler and wherein the IC tag and sensor equipped bearing assembly comprises a bearing for supporting a belt roller.

38. The abnormality detecting system as claimed in claim 31, wherein the machine facility comprises a railway vehicle and wherein the IC tag and sensor equipped bearing assembly comprises a wheel support bearing and further comprising a tag read/write terminal disposed along a path of travel of the railway vehicle to enable recording or reading information on or from the IC tag and also to enable the electric power source circuit to be supplied with an electric power.

39. A method of detecting the presence or absence of an abnormality in an IC tag and sensor equipped bearing assembly, wherein the IC tag and sensor equipped bearing assembly is formed by a rolling bearing incorporated in a machine facility and including an IC tag, a temperature sensor and an electric power source circuit, which is incorporated in the IC tag or which is separate from the IC tag and is supplied with an electric power from an outside of the bearing on a non-contact basis for driving the temperature sensor, and wherein a tag read/write terminal for recording and reading information on and from the IC tag and also for supplying an electric power to the electric power source circuit on the non-contact basis is utilized to drive the temperature sensor regularly or at a desired timing and to read the information recorded on the IC tag.

* * * * *